(12) United States Patent
Choinka et al.

(10) Patent No.: US 12,536,154 B1
(45) Date of Patent: Jan. 27, 2026

(54) WAYPOINT PREDICTION ENGINE(S) FOR COMPRESSING GEOGRAPHICAL INFORMATION SYSTEM DATA

(71) Applicant: NetApp, Inc., San Jose, CA (US)

(72) Inventors: Gerard Choinka, Dublin (IE); Anton Krug, Athy (IE)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/787,830

(22) Filed: Jul. 29, 2024

(51) Int. Cl.
*G06F 16/00* (2019.01)
*G01C 21/36* (2006.01)
*G06F 16/23* (2019.01)
*G06F 16/29* (2019.01)

(52) U.S. Cl.
CPC ..... *G06F 16/2365* (2019.01); *G01C 21/3679* (2013.01); *G06F 16/29* (2019.01)

(58) Field of Classification Search
CPC ........ G06F 16/29; G06F 16/9537; G06F 8/38; G06F 9/44505; G06F 9/541; G06F 9/542; G06F 1/1626; G06F 16/24578; G06F 16/9535; G06F 16/9538; G06F 18/21326; G06F 18/21345; G06F 18/21355; G06F 3/04817; G06F 3/0482; G06F 3/04886; G05D 1/0005; G05D 1/101; G01C 21/3469; B60H 1/00014; B60L 58/12; G06Q 10/06; G06Q 50/06; G06Q 30/0283; G08G 5/53; G08G 5/54; G08G 5/55; G06N 20/20; G06N 5/04
See application file for complete search history.

(56) References Cited

U.S. PATENT DOCUMENTS

| | | | | |
|---|---|---|---|---|
| 5,121,325 A | * | 6/1992 | DeJonge | G05D 1/0005 701/123 |
| 2008/0125984 A1 | * | 5/2008 | Skendzic | G05B 23/0267 702/59 |
| 2015/0277441 A1 | * | 10/2015 | Garrido-Lopez | G08G 5/53 701/3 |
| 2016/0305791 A1 | * | 10/2016 | Neubecker | B60L 58/12 |

* cited by examiner

*Primary Examiner* — Shyue Jiunn Hwa

(57) ABSTRACT

Various embodiments of the present technology generally relate to systems and methods for providing a waypoint prediction engine and its functions. For example, a waypoint prediction engine may determine navigation data associated with a client device and a source model. The waypoint prediction engine may determine a current waypoint of the client device as the client device travels along a navigation route and generate, by a compression-side of the waypoint prediction engine, a predicted waypoint based on the source model and the navigation data. The compression-side may determine an accuracy of the predicted waypoint and generate a correction factor based on the accuracy of the predicted waypoint. The compression-side may transmit the correction factor to a decompression-side of the waypoint prediction engine, which may, in turn store the correction factor such that the correction factor and the source model allow for recreation of the navigation route of the client device.

20 Claims, 9 Drawing Sheets

WAYPOINT PREDICTION ENGINE(S) FOR COMPRESSING GEOGRAPHICAL INFORMATION SYSTEM DATA

TECHNICAL FIELD

Various embodiments of the present technology generally relate to compressing, transmitting, and storing geographical information system (GIS) data. More specifically, embodiments of the present technology relate to systems and methods for providing a waypoint prediction engine for compressing, transmitting, and storing GIS data without impacting the accuracy of the GIS data.

BACKGROUND

In the modern era, the generation and utilization of geographical information system (GIS) data have surged significantly, transforming various sectors by providing advanced spatial analysis and mapping capabilities. This proliferation is driven by the widespread availability of high-resolution satellite imagery, the integration of GPS technology in everyday devices, and the advent of sophisticated data collection tools such as drones and IoT sensors. GIS data is now pivotal in urban planning, environmental monitoring, disaster management, and transportation logistics, enabling more precise decision-making and efficient resource management. As industries and governments recognize the value of spatial data, GIS technology continues to evolve, fostering innovative applications that enhance our understanding and management of the world's geographical landscapes.

Despite the numerous advantages of GIS data in modern applications, the generation and use of such extensive datasets come with significant challenges, particularly in the areas of data transmission and storage. The sheer volume of high-resolution imagery and detailed spatial data can lead to substantial bandwidth requirements, making real-time data transmission difficult and costly. This is especially problematic in remote or underdeveloped areas with limited internet infrastructure. Additionally, storing large GIS datasets necessitates significant investment in robust, scalable storage solutions, which can be prohibitively expensive for smaller organizations. The environmental and energy costs associated with maintaining vast amounts of GIS data are also considerable. Data centers require substantial electricity to power and cool the servers that store this information, contributing to carbon emissions and increasing the overall ecological footprint of GIS operations. Managing and maintaining these vast datasets requires specialized technical expertise to ensure data integrity, security, and accessibility, further compounding the challenges associated with the widespread use of GIS data.

To address the challenges associated with storing vast amounts of GIS data, conventional approaches often focus on reducing the size of datasets or limiting the number of data points stored. One common method involves data compression techniques, which condense data files to reduce storage requirements and improve transmission efficiency. Another approach is data aggregation, where detailed data points are summarized or averaged to decrease the overall volume of information stored. However, these methods can lead to significant drawbacks, such as loss of spatial and temporal resolution, which diminishes the accuracy and granularity of GIS analyses. Reduced data fidelity may compromise the precision of spatial models and decision-making processes reliant on detailed geographical information. Furthermore, aggregating data may obscure localized trends or anomalies that are critical for certain applications, such as environmental monitoring or urban planning.

Accordingly, there exists a need for improved systems and techniques that can compress GIS data without impacting the accuracy and granularity of the GIS data. Specifically, there exists a need for waypoint prediction engine(s) as provided herein for compressing, transmitting, and storing GIS data.

The information provided in this section is presented as background information and serves only to assist in any understanding of the present disclosure. No determination has been made and no assertion is made as to whether any of the above might be applicable as prior art with regard to the present disclosure.

OVERVIEW

Technology is disclosed herein for systems and techniques for providing a waypoint prediction engine for compressing, transmitting, and storing GIS data without impacting the accuracy of the GIS data. In an example, a waypoint prediction engine may determine navigation data associated with a client device or with a navigation event, such as a user commuting to work. The waypoint prediction engine may also determine a source model for the client device. The source model may be selected based on a navigation mode used by the client device for the navigation event, such as walking, driving, or biking. In some cases, the source model may be selected based on the user of the client device, as well as the navigation mode, such as the user being a delivery driving operating a large truck.

Based on the navigation data and the source model, the waypoint prediction engine may generate a predicted waypoint. The predicted waypoint may be a prediction of where the client device may be at a next waypoint check based on historical waypoints. As will be expanded on in greater detail below, this may include estimating a speed and direction that the client device will travel based on historical waypoints. The waypoint prediction engine may then determine the accuracy of the predicted waypoint. To determine the accuracy of the predicted waypoint, the waypoint prediction engine may determine a current waypoint of the client device, such as the measured or captured waypoint of the client device. Based on the current waypoint, the waypoint prediction engine may determine the accuracy of the predicted waypoint. If the predicted waypoint is accurate based on respective tolerance criteria, the waypoint prediction engine may continue to predict the next subsequent waypoint. However, if the predicted waypoint is inaccurate, the waypoint prediction engine may refine the predicted waypoint.

To refine the predicted waypoint, the waypoint prediction engine may generate a correction factor for the predicted waypoint. The correction factor may align or otherwise correct the predicted waypoint with the current waypoint. As will be described in greater detail below, the correction factor may be adjustments to one or more parameters of the source model used to generate the predicted waypoint. As such, based on the correction factor, the waypoint prediction engine may generate a corrected waypoint based on the correction factor and the predicted waypoint.

The waypoint prediction engine may include a compression side and a decompression side. The compression side may be executed locally on, for example, the client device. The compression side may generate the predicted waypoint and generate a refinement if required. Simultaneously, the decompression side may also generate the predicted waypoint. Since both the compression side and the decompression side of the waypoint prediction engine generate the predicted waypoint using the same source model and navigation data, the predicted waypoints generated by each side may be the same or substantially similar. The decompression side may not evaluate the accuracy of the predicted waypoint and instead assume that the predicted waypoint is accurate unless indicated by the compression side. As such, the compression side may transmit a correction factor or a corrected waypoint for any predicted waypoint that is not accurate, which the decompression side may in turn store.

However, for accurately predicted waypoints, the compression side may not transmit any correction. In some cases, the compression side may transmit an indication at set time or waypoint intervals to indicate that one or more predicted waypoints are accurate. As will be expanded on below, because the correction factors or corrected waypoints are transmitted between the compression side and the decompression side instead of each and every waypoint, the waypoint prediction engine can reduce the amount of data transmitted and the storage capacity of the respective data needed to recreate a respective navigation event, without impacting the overall accuracy and precision of the underlying data.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

The accompanying drawings, which are incorporated into and constitute a part of this specification, illustrate one or more certain aspects and, together with the description of the example, serve to explain the principles and implementations of the certain examples.

Figure 1:
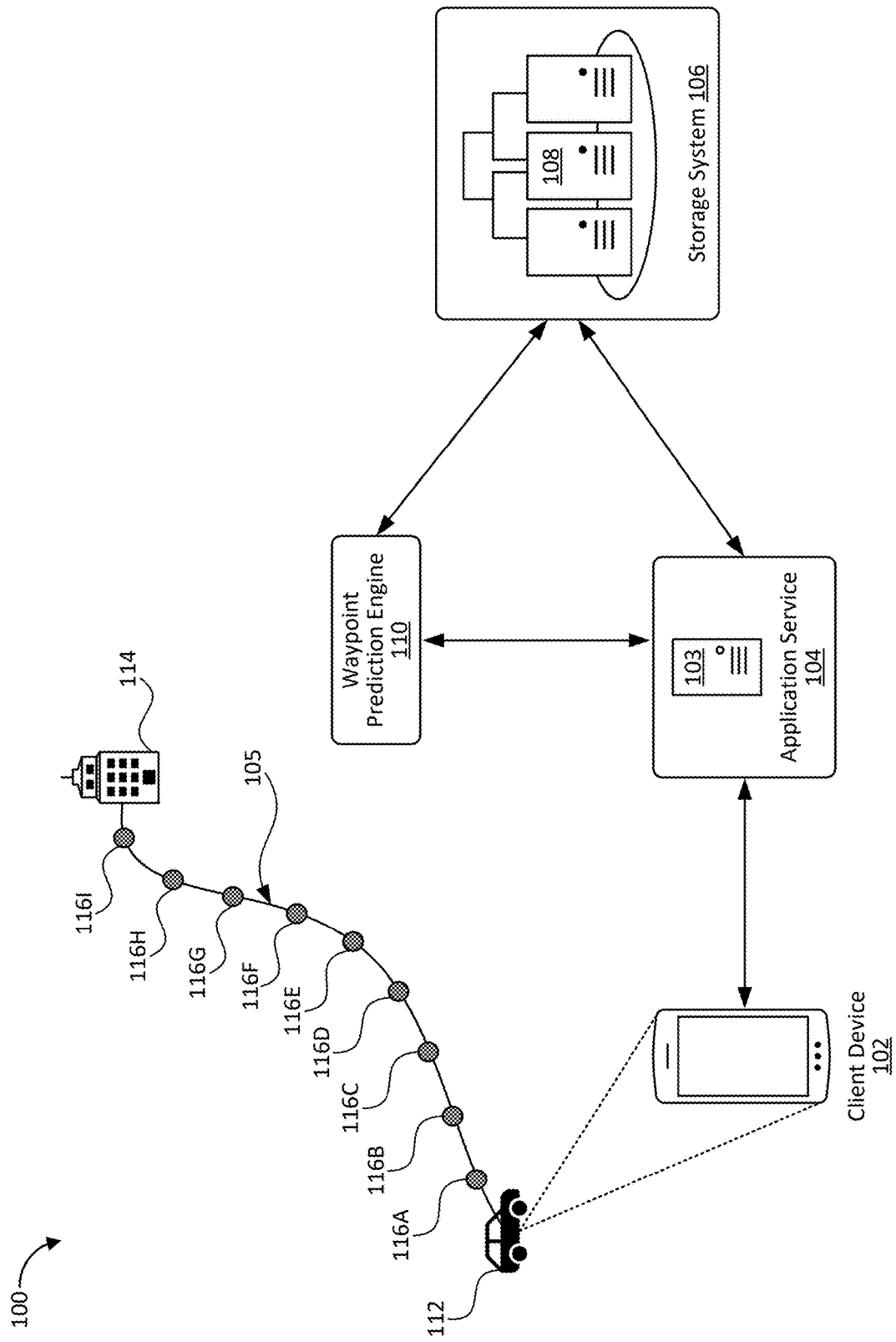
FIG. 1 illustrates an example operational environment in which a user initiates a navigation event using an application service, according to an embodiment herein.

Some components or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

In the modern era, the generation and utilization of GIS data have surged significantly, revolutionizing numerous sectors with its capabilities for precise spatial analysis and mapping. Industries ranging from urban planning and agriculture to disaster response and natural resource management increasingly rely on GIS to make informed decisions based on spatial data. For instance, urban planners use GIS to optimize infrastructure development and land use, while agricultural professionals employ it for precision farming techniques that enhance crop yields and resource efficiency. Environmental scientists utilize GIS to monitor and model ecosystems, aiding in conservation efforts and climate change research. Even in everyday life, navigation systems are used by people during their daily commutes, providing real-time traffic updates and optimal route planning based on GIS data. Moreover, the integration of satellite imagery, GPS technology, and IoT sensors continues to expand the scope and accuracy of GIS applications, driving innovation and efficiency across diverse fields.

As GIS data becomes more pervasive in modern society, its generation, transmission, and storage present significant challenges. The exponential increase in data volumes strains existing infrastructure, requiring robust systems to handle the influx of information. For instance, a common GIS data value, such as a waypoint recording location with longitude, latitude, and a timestamp, each taking up 8 bytes, consumes a total of 24 bytes per waypoint stored. While this may seem manageable for individual data points, the cumulative effect across millions of waypoints, collected from numerous sources like GPS devices or IoT sensors, rapidly escalates storage requirements. This not only demands scalable storage solutions but also poses logistical and cost challenges, particularly for organizations managing large-scale GIS datasets. Moreover, the need for real-time data transmission exacerbates bandwidth constraints, especially in remote or resource-limited regions, where reliable internet connectivity may be scarce.

As noted above, one challenge posed by the vast amounts of generated GIS data is the issue of data storage. The sheer volume of spatial information, including high-resolution imagery, detailed mapping data, and continuous updates from real-time sources like GPS and satellite systems, necessitates substantial storage capacity. This can lead to considerable costs associated with acquiring and maintaining storage infrastructure capable of handling terabytes or even petabytes of data. Moreover, storing large datasets requires robust data management practices to ensure data integrity, security, and accessibility. The environmental impact of data centers used for storage also cannot be overlooked, as they consume significant amounts of energy for powering servers and cooling systems, contributing to carbon emissions and environmental footprint. Additionally, the sheer size of GIS datasets can pose logistical challenges in terms of data transfer speeds, backup procedures, and disaster recovery strategies, making efficient data governance and resource allocation critical for organizations leveraging GIS technologies.

Conventional approaches to managing the vast amounts of generated GIS data often center on strategies aimed at reducing dataset sizes or limiting the number of data points captured and/or stored. One common method involves data compression techniques, which condense large files to minimize storage requirements and improve data transmission efficiency. However, compression can introduce lossy data representations, potentially compromising the accuracy and fidelity of spatial analyses. For instance, reducing the resolution of high-resolution imagery or aggregating data points may obscure fine-grained details and variations within datasets, crucial for applications requiring precise spatial resolution. Similarly, limiting the number of stored data points can lead to oversimplification of complex geographical phenomena, impacting the reliability of analytical models and decision-making processes reliant on detailed GIS information. These trade-offs underscore the challenge of balancing data reduction strategies with maintaining the integrity and utility of GIS datasets across diverse fields such as urban planning, environmental monitoring, and infrastructure management.

To address at least these shortcomings of conventional approaches to managing GIS data, an example waypoint prediction engine is provided herein. As will be described in greater detail below, the waypoint prediction engine may include a compression module and a decompression module. The compression module may be executed locally on a user's client device and the decompression module may be executed remotely, such as within a cloud-computing environment. When a client device initiates a navigation event, such as starting a navigation application, both the compression module and the decompression module may generate a predicted waypoint based on a source model associated with the client device. For example, a source model may be associated with a client device of a user who commutes from home to the office on a daily basis. Because the source model is trained on historical waypoints generated by the user commuting between the home and the office or other users following similar routes, the source model may provide a framework from which the waypoint prediction engine can predict where the client device will be at a next waypoint check. That is, the waypoint prediction engine can predict the next waypoint for the client device by identifying patterns and trends within the historical waypoints, and in some cases, using statistical techniques and machine learning (ML) algorithms to extrapolate from the historical waypoints to generate a predicted waypoint.

Once a predicted waypoint is generated, the compression-side of the waypoint prediction engine may evaluate the accuracy of the predicted waypoint. If the predicted waypoint is not accurate or fails to have an accuracy within a tolerance threshold, the waypoint prediction engine may generate a correction factor. The correction factor may be applied to the predicted waypoint to generate a corrected predicted waypoint that meets the accuracy criteria. In contrast, however, if the predicted waypoint is accurate, then the waypoint prediction engine may continue onto predicting the next waypoint. Since the compression-side and the decompression-side of the waypoint prediction engine are operating in parallel both may generate the same or substantially similar (e.g., within a tolerance) predicted waypoint. Thus, only when the compression-side determines that a predicted waypoint is not accurate and generates a correction factor to rectify the inaccuracy of the predicted waypoint, does the compression-side transmit the correction factor to the decompression-side. In other words, only correction factors are transmitted to the decompression-side of the waypoint prediction engine, which in turn may store the correction factors.

The decompression-side may store the correction factors for a respective navigation event and identify an associated source model, and in some cases, navigation data (e.g., map), this may be referred to as route information. Because the source model can generate predicted waypoints that were accurate and the correction factors are stored to correct any inaccurate predicted waypoints, the navigation event can be recreated with accuracy and granularity. However, because only correction factors or in some cases corrected waypoints are stored as associated with a respective source model, the amount of GIS data transmitted and stored may be greatly reduced over conventional techniques. As can be appreciated, storing correction factors (or corrected predicted waypoints) for a subset of waypoints generated during a navigation event requires less transmission bandwidth and storage capacity than storing each and every waypoint of the navigation event. In some cases, the transmission and storage requirements for a navigation event using the waypoint prediction engine may be reduced by up to 90 percent or more, such as in the case of a substantially accurate source model where a minimal number of correction factors are required.

By reducing the amount of GIS data required to be transmitted and stored without impacting the accuracy or granularity of the underlying data, the waypoint prediction engine provides numerous benefits over conventional approaches. For example, the waypoint prediction engine may enable faster transmission across networks by reducing the size of data being transmitted, which may be particularly advantageous for real-time applications and remote sensing scenarios. Additionally, by preserving the high resolution and detail of the GIS data, the waypoint prediction engine may ensure that critical geographic information is not lost, especially in operations such as mapping, urban planning, disaster management, and environmental monitoring where precision is essential. Furthermore, by minimizing the amount of data being stored, the waypoint prediction engine may lower storage costs and resource consumption, allowing for easier management and maintenance of large datasets, as well as lowering the environmental impact of storing large datasets.

Figure 9:
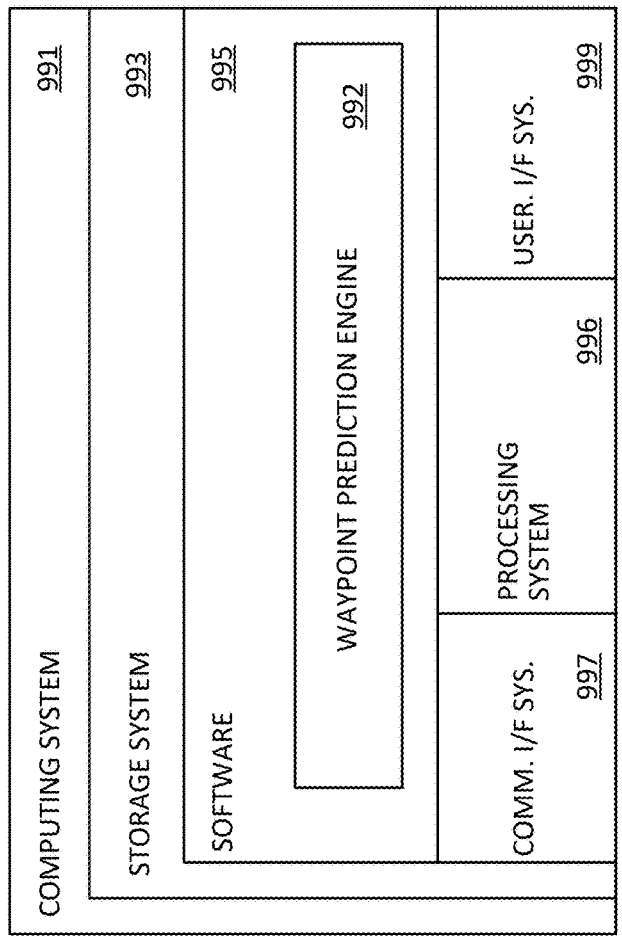
FIG. 9 shows an example computing device suitable for providing a waypoint prediction engine and its related functions, according to an embodiment herein.

Turning now to the Figures, FIG. 1 illustrates an example operational environment 100 in which a user, such as the user of a client device 102, initiates a navigation event using an application service 104. Broadly speaking, the applications service 104 provides software application services to endpoints, such as the client device 102, examples of which include navigation software for generating navigation content (e.g., mapping and navigation applications that provide route planning, traffic analysis, or location-based services). The application service 104 employs one or more server computers 103 co-located with respect to each other or distributed across one or more data centers. Example servers include web servers, application servers, virtual or physical servers, or any combination or variation thereof, of which computing system 901 in FIG. 9 is broadly representative.

The client device 102 communicates with the application service 104 via one or more internets and intranets, the Internet, wired and wireless networks, local area networks (LANs), wide area networks (WANs), or any other type of network or combination thereof. Examples of the client device 102 may include personal computers, tablet computers, mobile phones, gaming consoles, wearable devices, Internet of Things (IoT) devices, and any other suitable devices, of which computing system 901 in FIG. 9 is also broadly representative.

The client device 102 may load and execute software applications locally that interface with services and resources provided by the application service 104. For example, the user of the client device 102 may use a navigation application provided by the application service 104 for route planning during his or her commute to work. As such, the navigation application may provide route planning as the user drives a car 112 to an office building 114. The navigation application, or any other application provided by the application service 104, may be or include natively installed and executed applications, web-based applications that execute in the context of a local browser application, mobile applications, streaming applications, or any other suitable type of application. Example services and resources provided by the application service 104 include front-end servers, application servers, content storage services, authorization and authentication services, and the like.

As shown, the application service 104 may be in operational communication with a storage system 106. As GIS data is generated by the client device 102 traveling along a navigation route 105, the application service 104 may communicate with the storage system 106 to store the GIS data. For example, as the client device 102 navigates, the navigation application continuously collects and processes geographic information such as location coordinates, traffic conditions, and route choices. Here, the GIS data may include waypoints 116A-I. Each of the waypoints 116A-I may include location coordinates, and in some cases, a timestamp for where the client device 102 is at when a respective waypoint is measured or collected. Once each of the waypoints 116A-I is collected, the respective data is transmitted to the storage system 106 using secure, real-time communication protocols, such as HTTPS or MQTT. The storage system 106, which may have a cloud-based infrastructure, includes a combination of resources 108 like scalable databases, distributed storage arrays, and data warehouses designed to handle large volumes of spatial data efficiently. These resources 108 ensure that the GIS data is stored reliably and can be accessed quickly for future analysis, enabling improved navigation services and the potential for generating valuable insights into traffic patterns, user behaviors, and route optimizations.

As described above, under conventional approaches, the application service 104 may collect and transmit each of the waypoints 116A-I to the storage system 106 for storage. As can be appreciated, while the illustration only depicts nine waypoints, in real scenarios, hundreds if not thousands of waypoints may be collected and transmitted to the storage system 106 for storage. Since each of these waypoints 116A-I typically includes a latitude, longitude, and timestamp, the overall transmittance and storage capacity for an individual waypoint is 24 bytes. As such, in aggregate, transmitting and storing the waypoints 116A-I for the client device's 102 navigation event may require substantial storage space and bandwidth. As noted, this high storage requirement can lead to increased costs and resource consumption for maintaining and scaling the storage infrastructure. Additionally, the extensive data transmission can result in higher latency and potential bottlenecks, negatively impacting the responsiveness and performance of the navigation application.

To reduce or compress the amount of GIS data required to be transmitted and stored, the application service 101 includes an integration with a waypoint prediction engine 110. As will be described in greater detail below, the waypoint prediction engine 110 may generate predicted waypoints based on a source model associated with the client device 102, and in some cases, navigation data associated with the navigation route 105. As the client device 102 travels along the navigation route 105, the waypoint prediction engine 110 may predict each waypoint 116A-I. For example, based on the client device's 102 initial waypoint, such as the waypoint 116A, the waypoint prediction engine 110 may generate a predicted waypoint for the waypoint 116B. When the car 112 arrives at the waypoint 116B, the navigation application may measure the client device's location as the current waypoint 116B. If the predicted waypoint is the same as the current waypoint 116B, the waypoint prediction engine 110 may then predict the next waypoint for the waypoint 116C. If the predicted waypoint is not the same as the current waypoint 116B, then the waypoint prediction engine 110 may generate a correction factor to correct the predicted waypoint to align with the current waypoint 116B.

As will be described below, the waypoint prediction engine 110 may transmit the correction factors, or in some cases, a corrected predicted waypoint to the application service 104 and/or the storage system 106 for storage. As such, when a predicted waypoint is accurate, the waypoint prediction engine 110 may continue on predicting the following waypoint without transmitting the predicted waypoint to the application service 104 and/or the storage system 106. As can be appreciated, if the waypoint prediction engine 110 accurately predicts each of the waypoints 116A-I, then the application service 104 may require minimal data be stored by the storage system 106. For example, the application service 104 may merely store information that indicates the date and time of the navigation event, the source model used, and respective navigation data. Based on this information, the navigation route 105 can be accurately recreated from the data stored by the storage system 106.

Figure 2:
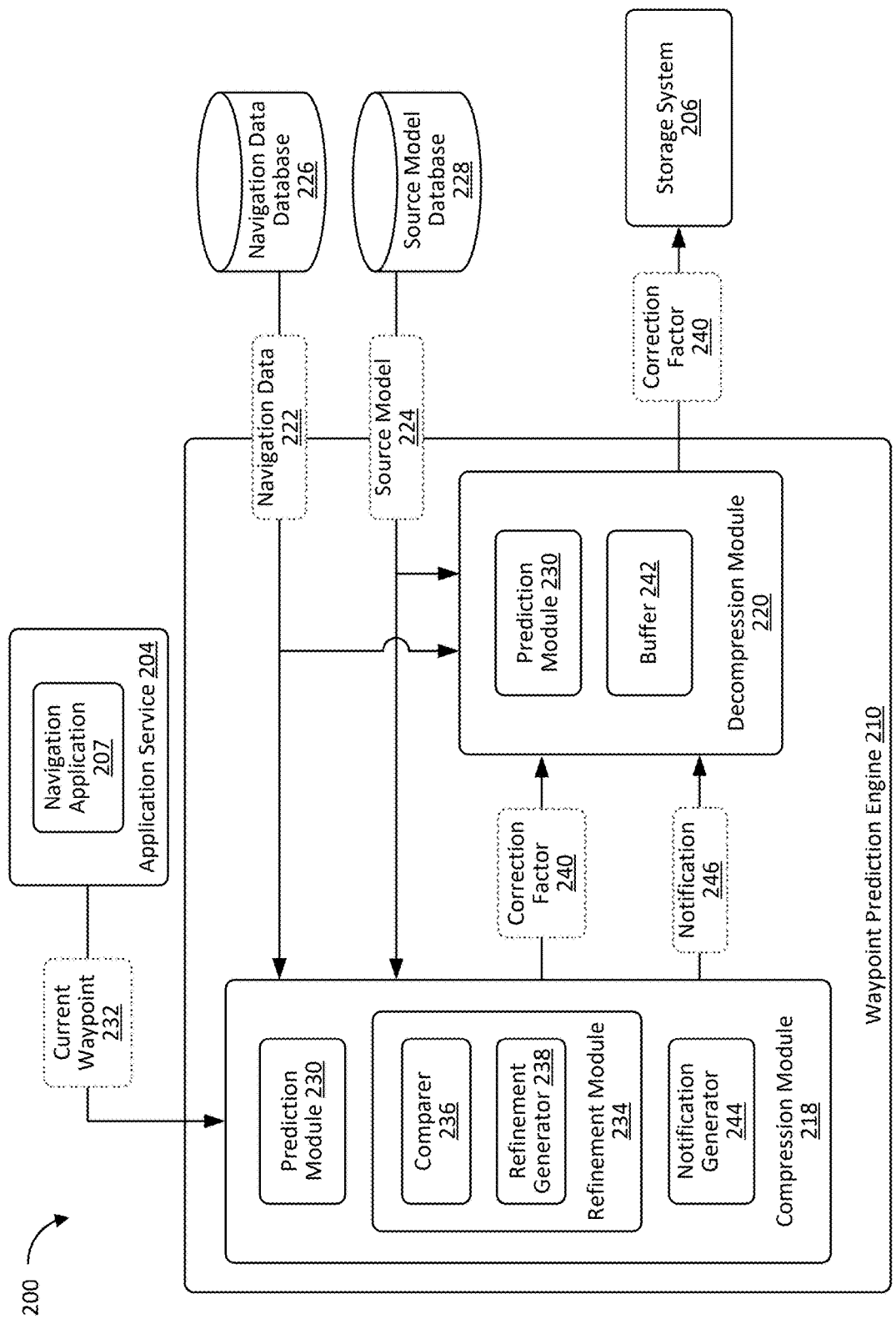
FIG. 2 illustrates an example operational environment including a waypoint prediction engine, according to an embodiment herein.

Referring now to FIG. 2, an example operational environment 200 including a waypoint prediction engine 210 is illustrated, according to an embodiment herein. As illustrated, the operational environment 200 includes the waypoint prediction engine 210, which may be the same or similar to the waypoint prediction engine 110, an application service 204, which may be the same or similar to the applications service 104, and a storage system 206, which may be the same or similar to the storage system 106. The application service 204 may provide a navigation application 207 that aids users in route planning and allows users to track travel during a navigation event.

Figure 3:
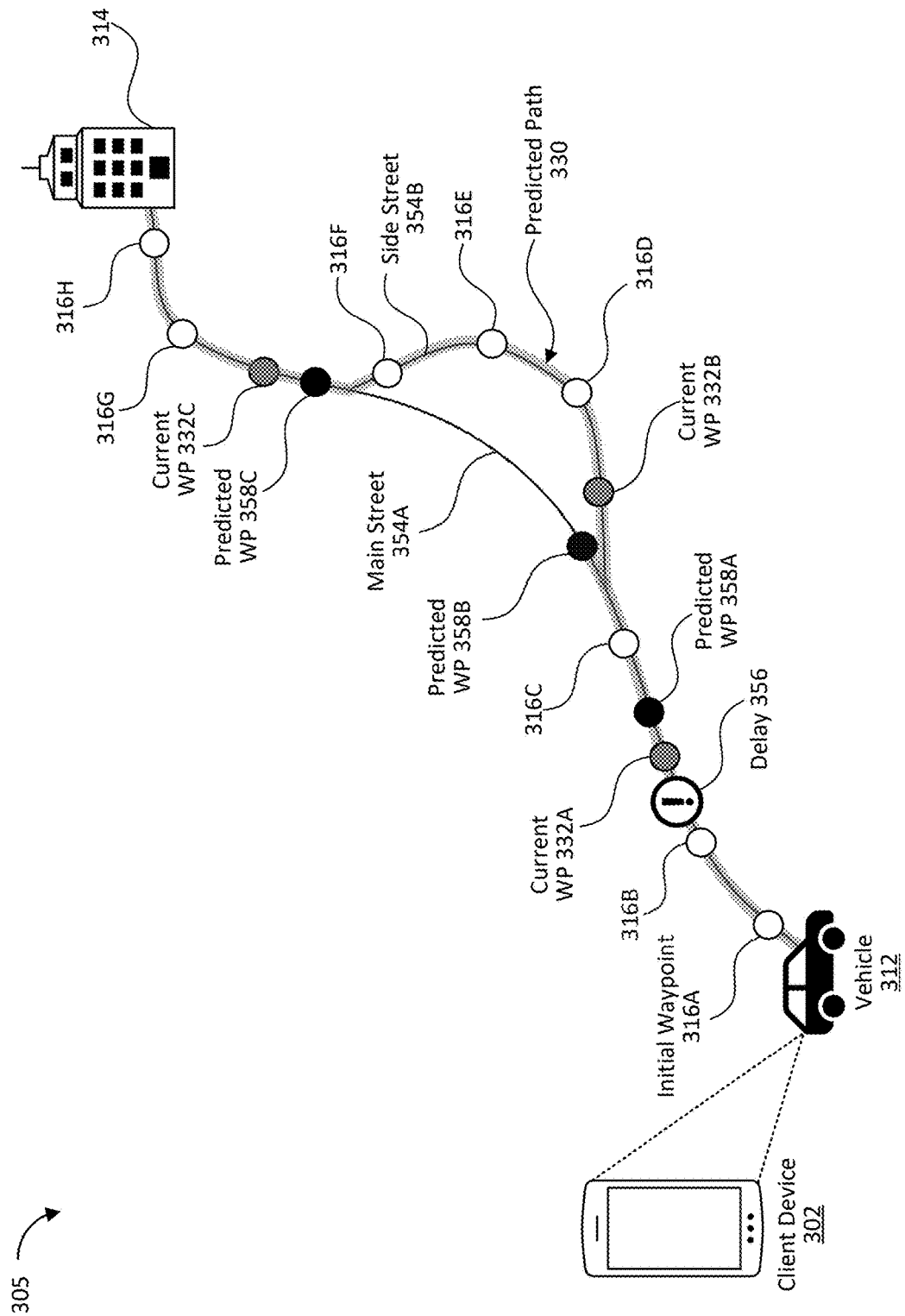
FIG. 3 illustrates a navigation route that a vehicle travels along using a navigation application, according to an embodiment herein.

For ease of explanation, FIG. 2 is described with respect to FIGS. 3-6. For example, FIG. 3 illustrates a navigation route 305 that a vehicle 312 travels along using a navigation application, such as the navigation application 207, according to an embodiment herein. A driver of the vehicle 312 may use a client device 302, which may be the same or similar to the client device 102, to run the navigation application 207 for routing purposes on the navigation route 305. The navigation application 207 may be provided by the applications service 204 and integrated with the waypoint prediction engine 210.

Figure 4:
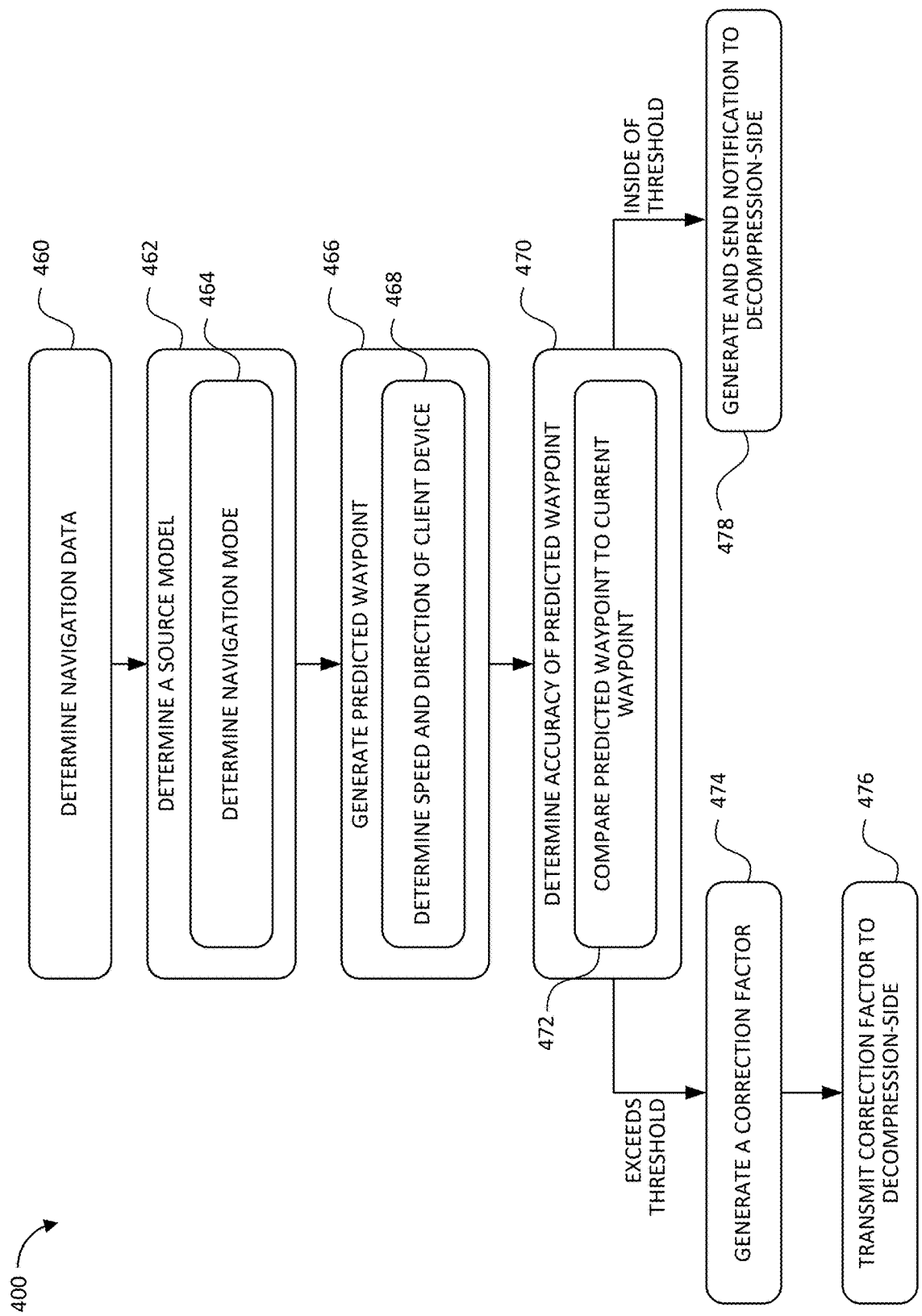
FIG. 4 illustrates an operational flow for providing a compression-side of the waypoint prediction engine depicted in FIG. 2, according to an embodiment herein.
Figure 5:
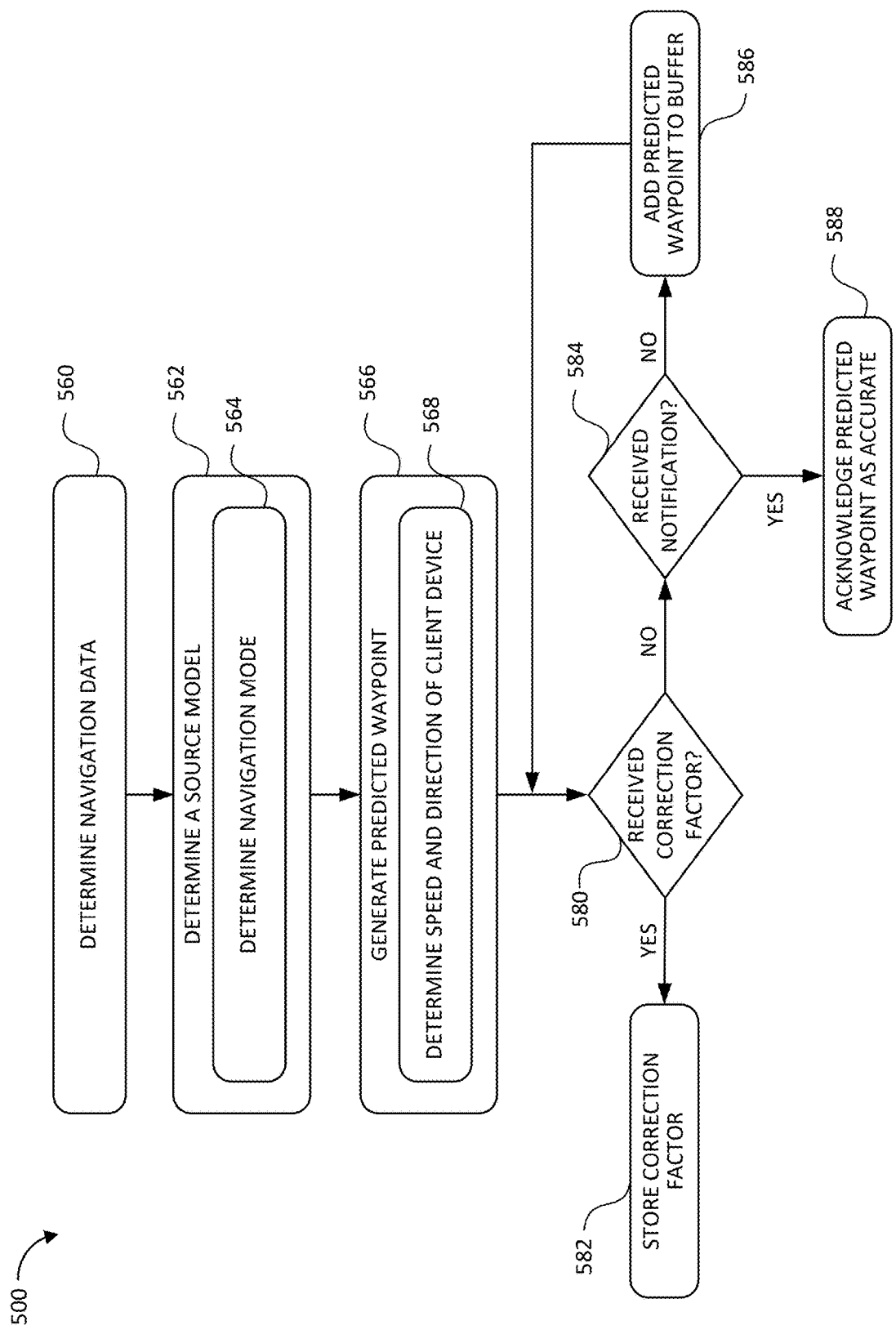
FIG. 5 illustrates an operational flow for providing a decompression-side of the waypoint prediction engine depicted in FIG. 2, according to an embodiment herein.

FIG. 2 is also described with respect to FIGS. 4 and 5. FIG. 4 illustrates an operational flow 400 for providing a compression-side of the waypoint prediction engine 210 and FIG. 5 illustrates an operational flow 500 for providing a decompression-side of the waypoint prediction engine 210, according to various embodiments herein. The operational flows 400 and 500 may be also referred to herein as the waypoint prediction engine processes 400 and 500, respectively. Additionally, although the operational flows 400 and 500 are described with respect to the components and elements of FIGS. 2 and 3, it should be appreciated that one or more steps of each respective flow may be executed or applied to components or elements of any other Figure provided herein. For ease of discussion, FIG. 2 will first be described with respect to FIG. 4 and then with respect to FIG. 5.

Returning to FIG. 2, as illustrated, the waypoint prediction engine 210 may include a compression module 218 and a decompression module 220. It should be appreciated that reference to a compression-side of the waypoint prediction engine 210 may refer to the compression module 218 and one or more of its functions, as described herein. Similarly, reference to a decompression-side of the waypoint prediction engine 210 may refer to the decompression module 220 and one or more of its functions as described herein. Although the compression module 218 and the decompression module 220 are illustrated together as part of the waypoint prediction engine 210, it should be appreciated that each module may be executed and operated in different locations. For example, the compression module 218 may be executed locally on the client device 302, while the decompression module 220 may be executed remote from the client device 302, such as within a cloud-computing environment. In some embodiments, the decompression module 220 may be integrated and executed as part of the application service 204. In other embodiments, the decompression module 220 may be integrated and executed as part of the storage system 206. In still other embodiments, the decompression module 220 may be executed by a third party and be in operational communication with the storage system 206, as described herein.

When the user of the client device 302 initiates his or her travel along the navigation route 305, the navigation application 207 may be in operational communication with the waypoint prediction engine 210. For example, when the user opens the navigation application 207 and starts a navigation event, then navigation application 207 may transmit an indication to the waypoint prediction engine 210 that the navigation event is starting. As noted above, the compression module 218 and the decompression module 220 may be executed in separate environments, and as such, the navigation application 207 may transmit an indication to one or both of the modules 218 and 220, and the receiving module may transmit the indication to a non-receiving module. For example, the navigation application 207 may transmit the indication to the compression module 218, which may in turn transmit a notification to the decompression module 220 that the navigation event is commencing.

When the waypoint prediction engine 210 detects that a navigation event is starting, such as receiving the indication from the navigation application 207, the waypoint prediction engine 210 may determine navigation data 222 for the navigation event (460). For example, when the client device 302 starts the navigation event, the navigation application 207 identifies and retrieves relevant navigation data 222 by first determining the starting location, such as an initial waypoint 316A, and intended destination, here an office building 314. In some embodiments, the navigation application 207 may share the navigation data 222 with the waypoint prediction engine 210, while in other embodiments, the navigation application 207 may share the initial waypoint 316A, and in some cases the intended destination, with the waypoint prediction engine 210, which in turn may determine the navigation data 222 based on this information.

In some embodiments, the compression module 218 and the decompression module 220 may determine the navigation data 222 separately. For example, each respective module 218 and 220 may determine the navigation data 222 based on the initial waypoint 316A of the client device 302. In such cases, the compression module 218 and the decompression module 220 may verify that each module is using the same navigation data 222, such as transmitting a verification request including information on the navigation data 222 identified for the navigation event. For example, the compression module 218 may transmit a verification request to the decompression module 220 indicating a version of the navigation data 222 being used to confirm that the decompression module 220 selected the same version of the navigation data 222.

The navigation data 222 may be stored in a navigation data database 226. The navigation data database 226 may be a specialized repository designed to store and manage extensive navigation data 222 used by navigation applications, such as the navigation application 207. The navigation data database 226 may contain various navigation data, such as detailed digital maps that include geographic information such as roads, highways, intersections, landmarks, and points of interest. Additionally, the navigation data database 226 may store dynamic data like real-time traffic conditions, historical traffic patterns, road incident reports, and weather-related information. The navigation data database 226 may be structured to allow efficient querying and retrieval, enabling the navigation application 207 and/or the waypoint prediction engine 210 to quickly access and integrate the necessary navigation data for route planning and guidance. In some embodiments, the navigation data database 226 may be hosted by the application service 204, the waypoint prediction engine 210, or by a third party.

The waypoint prediction engine 210 may also determine a source model 224 for the navigation event (462). In particular, the compression module 218 and the decompression module 220 may determine the source model 224, in some cases individually. The source model 224 may be stored in a source model database 228, which may be hosted by the application service 204, the waypoint prediction engine 210, or by a third party. If the compression module 218 and the decompression module 220 identify the source model 224 separately, then the modules 218 and 220 may verify that they are using the same source model 224, such as by sending a verification request between themselves.

The source model may be a framework or model which identifies patterns or trends from historical navigation events for users having similar characteristics, such as users in the same geographical location using the same navigation mode (e.g., walking, driving, hiking, biking). In some cases, the source model may be a statistical or predictive model that allows for extrapolation from historical waypoints to predict the behavior of a current user. In some cases, the source model 224 may be a machine learning (ML) algorithm or a neural network that allows for advanced predictive learning based on historical behaviors of users having similar characteristics. In some embodiments, the source model 224 may be a stateless source model (e.g., for a car source model contain variables such as max speed, max acceleration, max deceleration, can only drive on roads), while in other embodiments, the source model 224 may be a stateful model (e.g., for a specific user driving a car incorporate historical behavior of that user).

The source model database 228 may contain numerous source models 224 each trained on historical data generated by users having similar characteristics. In an example, a source model 224 may be trained on the historical data of the user of the client device 302 commuting along the navigation route 305. That is, the user of the client device 302 commutes to the office building 314 on a daily basis. As such, the waypoint prediction engine 210 may train the source module 224 on the client device 302 as it commutes daily. In another example, the source model 224 may be trained on delivery drivers who operate large trucks within a similar geographic location. Since large trucks often have to avoid certain routes due to road limitations (e.g., bridge height limitations), the source model 224 may be trained on historical behavior (e.g., waypoints) that follow the common routes taken by the delivery drivers. In yet another example, the source model 224 may be trained on runners within a particular region of a city. Since runners move at a different speed than a vehicle and can often use routes not available to motorized vehicles (e.g., sidewalks, walking paths), the source model 224 may be trained on historical data that reflects these characteristics.

In some embodiments, the waypoint prediction engine 210 may determine the source model 224 for the client device 302 based on the navigation mode of the client device 302 (464). For example, the source model 224 may be selected because the client device 302 is traveling in the vehicle 312 along the navigation route 305. In some cases, the waypoint prediction engine 210 may receive an indication of the user's navigation mode from the navigation application 207, such as a user selection when the user selects the navigation route 305. In other embodiments, the source model 224 may be selected based on the user of the client device 302. For example, the waypoint prediction engine 210 may identify the source model 224 based on a user profile associated with the client device 302. In yet other embodiments, the waypoint prediction engine 210 may identify the source model 224 by executing multiple source models 224, such as a running source model, a biking source model, and a vehicle source model, and select the respective source model 224 based on how accurate the predicted waypoints are for the first few waypoints.

As shown, each of the compression module 218 and the decompression module 220 may include a prediction module 230. Once the source model 224 is selected, and in some cases verified as the selected source model for the partner module (e.g., the decompression module 220 to the compression module 218 or the compression module 218 to the decompression module 220), the prediction module 230 may generate a predicted waypoint for the client device 302 (466). That is, the compression module 218 may generate a predicted waypoint using the source model 224 and the decompression module 220 may also generate the predicted waypoint using the source model 224. Since each module 218 and 220 uses the same source model 224 and the navigation data 222, the predicted waypoint generated by each module's 218/220 prediction module 230 should be the same or substantially similar.

Figure 6:
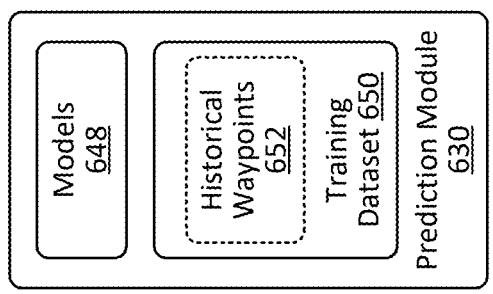
FIG. 6 illustrates an example prediction module, according to an embodiment herein.

To generate a predicted waypoint, the prediction modules 230 may determine a current waypoint, such as the initial waypoint 316A, and an estimated speed and/or direction of the vehicle 312 (468). Referring now to FIG. 6, an example prediction module 630 is illustrated, according to an embodiment herein. The prediction module 630 may be the same or similar to the prediction module 230. As shown, the prediction module 630 may include models 648 and a training dataset 650. The models 648 may include the selected source model 224. As noted above, in some cases, the waypoint prediction engine 210 may run multiple source models 224 at a time to determine which source model best fits the navigation route 305. In such cases, the models 648 may include multiple source models 224.

The respective source model 224 may be trained on the training dataset 650. The training dataset may include historical waypoints 652 generated over time. As noted above, each source model 224 may be trained on a dataset including historical waypoints 652 for users having similar characteristics, such as runners in a particular geographic location, or delivery drivers in a similar area. In the illustrated example, the historical waypoints 652 may be historically measured waypoints for the user of the client device 302 during his or her daily commute to the office building 314. Since the user typically follows main street 354A along the navigation route 305 to get to the office building 314, the historical waypoints 652 may include waypoints along the main street 354A. It should be appreciated that while the training dataset 650 and the historical waypoints 652 are illustrated as part of the prediction module 630, in some embodiments, the training dataset 650 and the historical waypoints 652 may be hosted and/or stored separately from the prediction module 630, or completely separate from the waypoint prediction engine 210 altogether.

From the historical waypoints 652, the prediction module 630 may determine a speed and/or direction of the vehicle 312. For example, the prediction module 630 may determine that the vehicle 312 is at the initial waypoint 316A and based on the historical waypoints 652 and the source model 224, predict that the vehicle 312 is traveling a particular speed in a particular direction (e.g., stopping at a stoplight and then turning left onto the main street 354A). Based on the estimated speed and/or direction, the prediction module 630 may generate a predicted waypoint estimating where the vehicle 312 will be at the next waypoint check (e.g., when the navigation system 207 measures or captures the next waypoint) along a predicted path 330, indicated by grey highlight.

In some embodiments, the prediction module 630 may use the navigation data 222 along with the source model 224 to predict the next waypoint along the predicted path 330. As can be appreciated, using the entirety of the navigation data 222, such as an entire map of a region for prediction may require more processing and memory capacity. Since the compression-side prediction module 630 may be running locally on the client device 302, higher processing and memory capacity may be problematic. As such, in some cases, the navigation data 222 may be segmented into smaller chunks and provided to the prediction module 630 in segments as the vehicle 312 progresses along the navigation route 305.

Returning to FIG. 2, once the predicted waypoint is generated, the waypoint prediction engine 210 may determine the accuracy of the predicted waypoint (470). In particular, the compression module 218 may determine the accuracy of the predicted waypoint. To determine the accuracy of the predicted waypoint, the compression module 218 may receive a current waypoint 232 from the navigation application 207. As can be appreciated, in some embodiments, the compression module 218 may retrieve the current waypoint 232 from the navigation application 207, while in other embodiments, the navigation application 207 may automatically provide the current waypoint 232 to the compression module 218 when measured or captured. The current waypoint 232 may be the waypoint measured or captured by the navigation application 207 at a particular waypoint check. For example, the navigation application 207 may measure the vehicle's 312 location at a set interval of time (e.g., every 5 seconds) and generate a waypoint at that time. As noted above, the waypoint may include the longitude, latitude, and a timestamp of the when the waypoint was measured. It should be appreciated that while the discussion herein uses waypoints as example GIS data, other types of GIS are contemplated, such as elevation data, attribute data, raster data, steering directions, Global Navigation Satellite System (GNSS) signal quality, and the like.

As illustrated, the compression module 218 may include a refinement module 234. The refinement module 234 may include a comparer 236 and a refinement generator 238. The comparer 236 may determine the accuracy of the predicted waypoint by comparing the predicted waypoint to the current waypoint 232 (472). From the comparison, the comparer 236 may determine a delta or difference between the predicted waypoint and the current waypoint 232. The delta may then be compared to a tolerance threshold to determine whether the predicted waypoint is accurate or not. As can be appreciated, the tolerance threshold may vary depending on a desired tolerance for the application of the waypoint prediction engine 210 and/or the navigation event. For example, for the daily commute to the office building 314, the tolerance threshold may be higher than an application involving mapping out an agricultural map for planting purposes. In other words, the precision of the predicted waypoint may vary depending on the application's specific requirements for detail.

If the refinement module 234 determines that the predicted waypoint is accurate (e.g., the delta within the tolerance threshold), the compression module 218 may continue to predict the next waypoint. For example, if the compression module 218 generated a predicted waypoint for the waypoint 316B that was accurate, the compression module 218 may then predict the next waypoint. Since the predicted waypoint for the waypoint 316B was accurate, the prediction module 230 may use the predicted waypoint for waypoint 316B to generate the next predicted waypoint. Since the decompression module 220 did not receive an indication that the predicted waypoint for the waypoint 316B was inaccurate, then decompression module 220 may also generate the next predicted waypoint using the predicted waypoint for the waypoint 316B.

As illustrated in FIG. 3, the prediction module 230 may generate the predicted waypoint (WP) 358A as the next predicted waypoint after the waypoint 316B along the predicted path 330. However, due to a delay 356, the vehicle 312 may travel at a speed slower than the speed estimated by the prediction module 230 based on the historical waypoints 652. As such, the vehicle 312 may be at the current WP 332A at the next waypoint check. Thus, when the refinement module 234 determines the accuracy of the predicted WP 358A, the refinement module 234 may determine that the predicted WP 358A is not accurate within the tolerance threshold. For example, the comparer 236 may determine the delta between the predicted WP 358A and the current WP 332A is over the tolerance threshold set for the current navigation event.

Once the refinement module 234 determines that the predicted WP 358A is not accurate within the tolerance limit, the refinement module 234 may determine a refinement for the predicted WP 358A. A refinement for the predicted WP 358A may be a correction factor 240 to be applied to the predicted WP 358A to bring it within the tolerance threshold to the current WP 332A. For example, the correction factor 240 may be adjustments to the parameters used by the source model 224 to correct the speed at which the prediction module 230 predicts the vehicle 312 would be traveling after the waypoint 316B. As illustrated in FIG. 3 by a predicted WP 358B and current WP 332B, the correction factor 240 may be to the speed and direction estimated by the prediction module 230, such as in the case that the vehicle 312 takes a side street 354B instead of the main street 354A along the navigation route 305. As can be appreciated, the correction factor 240 may depend on the application of the waypoint prediction engine 210, the characteristics being used to generate the next predicted datapoint (e.g., waypoint). While the current example uses the speed and direction as characteristics to predict the next datapoint, in other applications characteristics such as geographical attributes, elevation, slope, population density, and the like may be used. As such, the correction factors for alternative embodiments may vary depending on the characteristics.

When the refinement module 234 generates the correction factor 240, the compression module 218 may use the correction factor 240 to generate a corrected predicted waypoint (474), also referred to herein as a corrected waypoint. In the illustrated example on FIG. 3, the corrected waypoint may be the same or substantially similar to the current WP 332A. As will be expanded on in greater detail with respect to FIG. 8, in some cases, the refinement module 234 may perform multiple refinement processes, each of which further refines the predicted WP 358A. For example, when the corrected waypoint is generated, the comparer 236 may analyze the accuracy the corrected waypoint against another tolerance threshold, which may be different from the initial tolerance threshold against which the predicted WP 358A was analyzed. As can be appreciated, this may allow for increased accuracy of a predicted waypoint, including a corrected predicted waypoint.

Once the corrected waypoint is generated, the refinement module 234 may provide the corrected waypoint to the prediction module 230 for use in the next waypoint prediction step. That is, once the corrected waypoint is generated to approximate the current WP 332A, the corrected waypoint is used to generate a predicted waypoint for the waypoint 316C. In some cases, the corrected waypoint is saved and incorporated into the historical waypoints 652 so that the source model 224 can learn from the correction factors and adapt as the navigation route 305 changes. For example, based on the current WP 332B being on the side street 354B instead of following the main street 354A as predicted by the predicted WP 358B, the source model 224 may adapt and learn that the traffic pattern is routing vehicles, such as the vehicle 312, down the side street 354B. As can be appreciated, this may be due to construction, an accident, a new traffic pattern, etc.

In addition to generating the corrected waypoint based on the correction factor 240, the compression module 218 may also transmit the correction factor 240 to the decompression module 220 (476). As noted above, since prediction module 230 of the decompression module 220 also generated the predicted WP 358A, when the decompression module 220 applies the correction factor 240 to the predicted WP 358A, the decompression module 220 may generate the same or substantially the same corrected waypoint as the compression module 218. The decompression module 220 may save the corrected waypoint as well, and in some cases, save the corrected waypoint as part of the historical waypoints 652 within its prediction module 230. Accordingly, similar to the compression module's 218 prediction module 230, the decompression module 220 may use the corrected waypoint to generate the next predicted waypoint along the predicted path 330.

Since the compression module 218, which may be running locally on the client device 302, only transmits the correction factor 240 when a predicted waypoint is generated that fails to meet a tolerance threshold, the waypoint prediction engine 210 may reduce the amount of data transmitted by the client device 302 during the navigation event. For example, instead of transmitting the data associated with each waypoint along the navigation route 305, which may include the waypoints 316A-H and current WPs 332A-C, the compression module 218 may only transmit the correction factors 240 for the predicted WPs 358A-C. Not only is there a reduction due to the decreased number of waypoints requiring data transmission, but the correction factors 240 themselves may also have a reduced data size over the data size of an entire waypoint. As noted above, a waypoint typically includes a latitude, longitude, and timestamp. The correction factor 240 may not include each of these values or the entirety (e.g., all 8 bytes) for each of these values. As such, the correction factor 240 may have a smaller data size than the data size of a corresponding waypoint.

Once the decompression module 220 receives the correction factor 240, the decompression module 220 may save the correction factor 240 and/or save the respective corrected waypoint. In some embodiments, the decompression module 220 may save the correction factor 240 and/or the corrected waypoint in the storage system 206. When saving the correction factor 240, the decompression module 220 may associate the correction factor with one or more of the source model 224, the navigation data 222, the initial waypoint 316A, and a timestamp of when the navigation event commenced. This may be referred to as route information. In some embodiments, route information stored by the decompression-side may contain a hash to uniquely identify the respective source model 224 and parameters (e.g., correction factors) used to recreate the exact navigation route 305.

Since the source model 224 accurately predicts the waypoints 316A-H, as indicated by the white circles, and the correction factors 240 for the predicted WPs 358A-C are stored, the navigation route 305 can be accurately recreated using the source model 224 and the correction factors 240 without impacting the precision and granularity of the underlying data. In other words, the waypoint prediction engine 210 allows for recreation of the navigation route 305 based on the stored correction factors 240 and the source model 224 without impacting the accuracy and precision of the underlying data.

As noted above, when a predicted waypoint is accurate, such as the predicted waypoints for the waypoints 316A-H, the compression module 218 may not generate and send a correction factor 240. That is, if the predicted waypoint is within the threshold, and thus is considered accurate within the tolerance criteria of the tolerance threshold, the compression module 218 may not generate or send a transmission for the decompression module 220 before proceeding to the next waypoint prediction. As such, the decompression module 220 may assume that each of the predicted waypoints generated on the decompression-side is accurate. However, there may be scenarios in which a predicted waypoint is inaccurate and the compression module 218 attempts to transmit the correction factor 240 to the decompression module 220 but is unable to complete the transmission due to a variety of reasons, such as poor coverage.

To avoid the decompression module 220 assuming the predicted waypoints are accurate due to the lack of receiving the correction factor 240, the decompression module 220 may add predicted waypoints to a buffer 242 until the decompression module 220 receives a notification 246 that the predicted waypoints are accurate. For explanation of such scenarios, the following discussion will first focus on the compression module 218 and then focus on the decompression module 220.

When a predicted waypoint is accurate, the compression module 218 may generate and send a notification that the predicted waypoint is accurate to the decompression module 220 (478). In particular, the compression module 218 may include a notification generator 244 that may generate the notification 246 that the predicted waypoint is accurate and send it to the decompression module 220. For example, when the refinement module 234 determines that a respective predicted waypoint is accurate, the refinement module 234 may transmit an indication that the predicted waypoint is accurate to the notification generator 244, which may in turn generate and send the notification 246 to the decompression module 220.

In some embodiments, the notification generator 244 may generate and send the notification 246 after each predicted waypoint is determined to be accurate. However, in other embodiments, the notification generator 244 may generate and send the notification 246 after a threshold number of accurate predicted waypoints is met, after a threshold time duration is met, or until an inaccurate predicted waypoint is encountered. For example, the notification generator 244 may generate and transmit the notification 246 after two, after five, after 10, after 20, or after 25 accurately predicted waypoints are determined. This may allow a single notification 246 to be sent to the decompression module 220 to indicate that the previous number (e.g., 2, 5, 10) of predicted waypoints are accurate. As can be appreciated, this may reduce the amount of transmission required between the compression module 218 and the decompression module 220.

In another example, the notification generator 244 may hold on generating and transmitting the notification 246 until a correction factor is encountered. That is, only once an inaccurate predicted waypoint is encountered and the compression module 218 transmits the correction factor 240 to the decompression module 220 does the notification generator 244 generate and transmit the notification 246 indicate that the previous number of predicted waypoints were accurate. In some embodiments, the notification 246 and the correction factor 240 may be transmitted in the same transmission.

As noted above, in the absence of a transmission from the compression module 218, the decompression module 220 may add a predicted waypoint to the buffer 242. For ease of explanation, the following discussion is made with respect to the process 500 of FIG. 5. As shown, the process 500 includes steps 560-568 which may be the same as the steps 460-468 of process 400, except performed by the decompression module 220. As such, as noted above, the decompression module 220 may generate the same predicted waypoint as the compression module 218. However, the decompression module 220 does not determine the accuracy of the predicted waypoint and instead relies on the compression module 218 to indicate the accuracy of the predicted waypoint. As such, once the decompression module 220 generates a predicted waypoint, the decompression module 220 may determine whether it has received a correction factor 240 from the compression module 218 for the respective predicted waypoint (580). As noted above, if the decompression module 220 receives the correction factor 240, the decompression module 220 may store the correction factor 240 (582), in some cases with the storage system 206.

When the decompression module 220 does not receive the correction factor 240 for a respective predicted waypoint, the decompression module 220 may determine whether or not the notification 246 has been received (584). If the notification 246 is not received for the predicted waypoint, then the decompression module 220 may add the predicted waypoint to the buffer 242 (586). The buffer 242 may hold the predicted waypoints as unverified accurate until the notification 246 or the correction factor 240 is received from the compression module 218. Since the compression module 218 may hold until a threshold number of accurate predicted waypoints are generated or a time threshold is met (e.g., a notification 246 is sent every 10 minutes), the buffer 242 may include multiple predicted waypoints at various times.

Once the decompression module 220 receives the notification 246 that a predicted waypoint is accurate, the decompression module 220 may acknowledge the predicted waypoint as accurate (588). This may include removing the respective predicted waypoint(s) from the buffer 242. In some cases, this may also include adding the accurately predicted waypoint to the historical waypoints 652 to be used by the source model 224 for future waypoint predictions.

Figure 7:
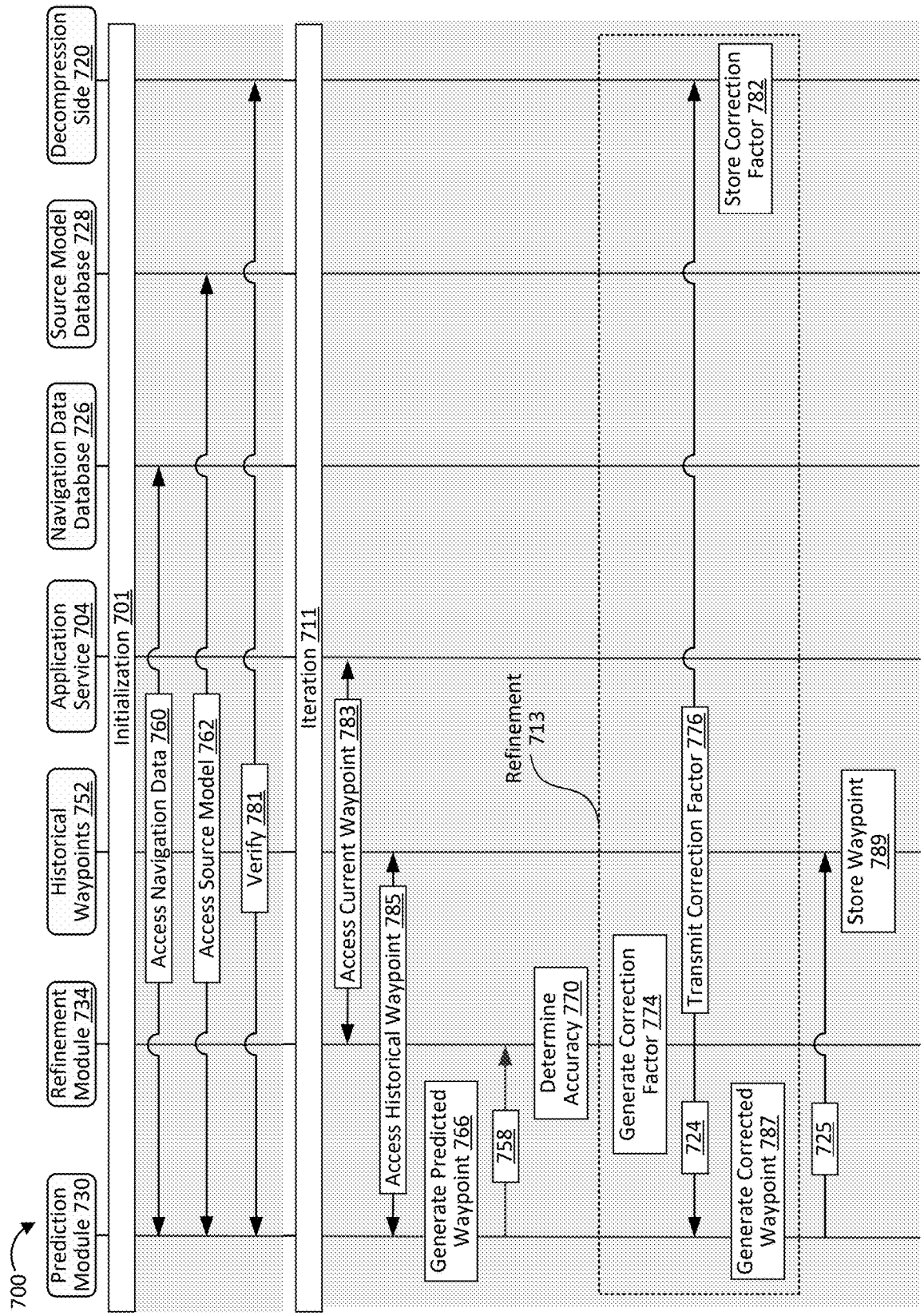
FIG. 7 illustrates an example operational flow for providing a waypoint prediction engine and one or more of its functions, according to an embodiment herein.

Referring now to FIG. 7, an example operational flow 700 for providing a waypoint prediction engine and one or more of its functions is illustrated, according to an embodiment herein. The operational flow 700 is illustrated from the perspective of the compression-side of the waypoint prediction engine, such as the compression module 218 of the waypoint prediction engine 210. The operational flow 700 illustrates an initialization stage 701 that may be performed when a navigation event commences, such as when the user starts along the navigation route 305 or opens the navigation application 207. The operational flow 700 also illustrates an iteration stage 711 which may be performed iteratively for each waypoint along the navigation route 305.

As shown, as part of the initialization stage 701, a prediction module 730, which may be the same or similar to the prediction modules 230 and 630, may access navigation data (760) for the navigation event, such as the navigation data 222. The prediction module 730 may retrieve or otherwise access the navigation data from a navigation data database 726, which may be the same or similar to the navigation data database 226. In addition to the navigation data, the prediction module 730 may access one or more source models (762) associated with the client device and/or the navigation event, such as the source model 224. Once the navigation data and the source model are identified and accessed, the prediction module 730 may verify that the decompression side, such as with the decompression module 220, is using the same navigation model and/or source model (781).

At the iteration stage 711, a refinement module 734, which may be the same or similar to the refinement module 234, may access a current waypoint (783) of the client device, such as receiving the current waypoint 232 from the navigation application 207. Simultaneously, the prediction module 730 may access one or more relevant historical waypoints (752) from a historical waypoints 752, which may be the same or similar to the historical waypoints 752. In particular, the prediction module 730 may access or otherwise retrieve historical waypoints that are temporally and/or physically proximate to the previously predicted or corrected waypoint. For example, the prediction module 730 may identify a set of historical waypoints that were captured for the vehicle 312 close to the waypoint 316B in the past 6 months. While the historical waypoints 752 may include historical waypoints measured close to the waypoint 316B for the past 2 years, the prediction module 730 may identify and use the historical waypoints that are temporally proximate to the current prediction (e.g., within the past 6 months).

Based on the historical waypoints retrieved from the historical waypoints 752, the prediction module 730 may generate a predicted waypoint (766), such as the predicted WP 358A, as described above. Once generated, the prediction module 730 may transmit the predicted waypoint to the refinement module 734 (758). Responsive to receiving the predicted waypoint, the refinement module 734 may determine the accuracy of the predicted waypoint (770). In some embodiment, this may include comparing the predicted waypoint to the current waypoint.

If the predicted waypoint is determined to be inaccurate, the operational flow 700 may process to a refinement stage 713. At the refinement stage 713, the refinement module 732 may generate a correction factor, such as the correction factor 240, for the predicted waypoint to better approximate the predicted waypoint to the current waypoint (774). In some cases, the correction factor may include one or more adjustments to the parameters of the source model to better estimate the predicted waypoint. Once generated, the refinement module 734 may transmit the correction factor back to the prediction module 730 (724), which in turn may generate a corrected waypoint based on the correction factor (787). As noted above, the prediction module 730 may transmit the corrected waypoint to or otherwise incorporate the corrected waypoint into the historical waypoints 752 (725). In some cases, this may include storing the corrected waypoint as part of the historical waypoints 752 (789).

Simultaneously or close to providing the correction factor to the prediction module 730, the refinement module 734 may also transmit the correction factor to the decompression side 720 (776). Responsive to receiving the correction factor, the decompression side 720 may store the correction factor (782), such as within a storage system like the storage system 206.

Figure 8:
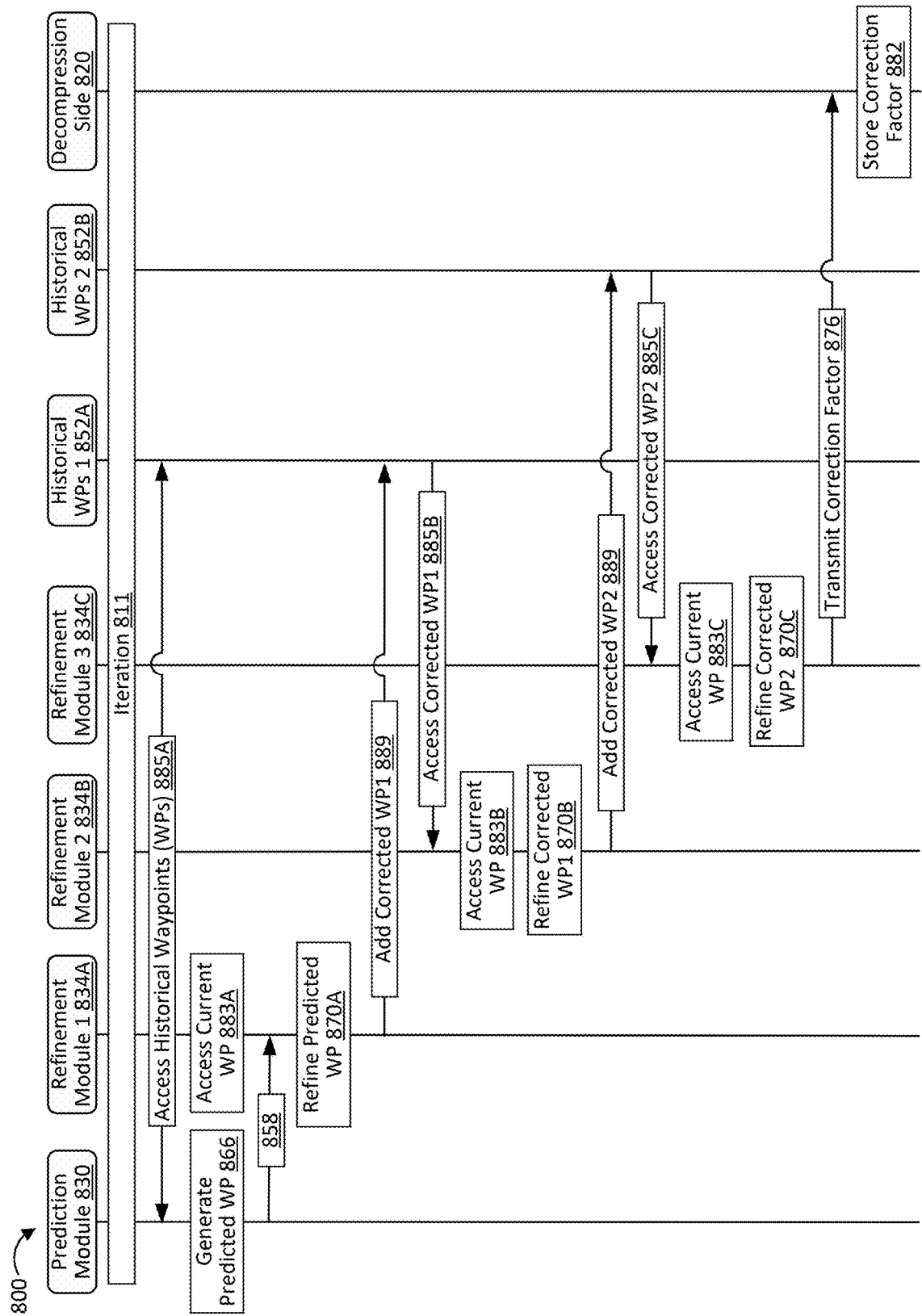
FIG. 8 illustrates an example operational flow of a multi-step refinement stage, according to an embodiment herein.

As noted above, in some cases, the refinement stage 713 may be a multi-stage process in which a predicted waypoint is refined or corrected multiple times. As can be appreciated, GIS data is inherently noisy and thus to achieve a desired level of loss compression, such as near-lossless compression, the refinement stage 713 may include multiple steps. Referring now to FIG. 8, an example operational flow 800 of a multi-step refinement stage, such as the refinement stage 713 is illustrated, according to an embodiment herein. By including multiple refinement stages, the waypoint prediction engine can allow for adjustment of acceptable data loss, which given the intrinsic noise of GIS data, allows for effective reduction in data volume without compromising the functionality of a respective application.

As shown, the operational flow 800 may be performed as part of the iteration stage 811, which may be the same or similar to the iteration stage 711, that the illustrated steps can be performed iteratively for each predicted waypoint generated. As a first step of the refinement stage, a prediction module 830, which may be the same or similar to the prediction module 730, may access historical waypoints (WP) (855A) from a first set of historical waypoints 852A. Based on the first set of historical waypoints 852A, the prediction module 830 may generate a predicted waypoint (866) and send the predicted waypoint to a first refinement module 834A, which may be the same or similar to the refinement module 734 (858).

In parallel, the first refinement module 834A may access a current WP (883A), such as the current waypoint 232. Once accessed, the refinement module 834A may refine the predicted waypoint (870A). Refining the predicted waypoint may include determining an accuracy of the predicted waypoint, generating a respective correction factor, and generating a corrected waypoint based on the predicted waypoint and the correction factor. Since the operational flow 800 is of a multi-step refinement process, the first refinement module 834A may generate a first corrected WP, indicated as "corrected WP1." The first corrected waypoint may then be added to the first set of historical waypoints 852A.

At a second step of the refinement stage, a second refinement module 834B may access or otherwise retrieve the first corrected waypoint (885B) from the first set of historical waypoints 852A. The second refinement module 834B may also access the current waypoint (883B) and refine the first corrected waypoint (870B). The second refinement module 834B may have a different tolerance threshold or tolerance criteria than the first refinement module 834A. For example, the second refinement module 834B may have a tight or more stringent tolerance threshold than the first refinement module 834A, meaning that the refinement module 834B may determine a second correction factor for the first corrected waypoint. Based on the second correction factor, the second refinement module 834B may generate a second corrected waypoint, indicated as "corrected WP2." The second corrected waypoint may be added to a second set of historical waypoints 852B (889).

The second set of historical waypoints 852B may contain refined historical waypoints 852A. The compression-side of the waypoint prediction engine may keep the second set of historical waypoints 882B and the first set of historical waypoints 852A separate since the second set may be sent to the decompression-side at a separate time. In contrast, on the decompression-side, once the second set of historical waypoints 852B are generated, the decompression-side may dispose of or delete the first set of historical waypoints 852A since they are a less accurate dataset.

At a third step of the refinement stage, a third refinement module 834C may access or otherwise retrieve the second corrected waypoint (885C) from the second set of historical waypoints 852B. The third refinement module 834C may also access the current waypoint (883C) and refine the second corrected waypoint (870C). The third refinement module 834C may have a different tolerance threshold or tolerance criteria than the first and second refinement modules 834A and 834B. As such, the third refinement module 834C may generate a third correction factor that is different than the first and second correction factors. Once generated, the third refinement module may send the third correction factor to the decompression side 820 (876) or may generate a third corrected waypoint and second the third corrected waypoint to the decompression side 820. Responsive to receiving the third correction factor and/or the third corrected waypoint, the decompression side 820 may store the third correction factor and/or third corrected waypoint (882).

The multi-step process illustrated by the operation flow 800 may enhance both the data quality and efficiency of the refinement process and resulting corrected waypoints. By dividing the refinement stage into multiple steps, each step can target specific data characteristics, leading to a more refined and accurate final correction factor. This approach may minimize data loss compared to a single-step refinement process by applying controlled levels of refinement at each stage. Additionally, the multistep refinement stage allows for customizable tolerances, applying varying levels of refinement based on the importance of the data being processed. This flexibility ensures the preservation of critical data features and allows users to modify and tailor allowed tolerance on an application-by-application basis. Given the inherent noise in GIS data, a multistep approach can include noise filtering stages that progressively reduce noise without significantly impacting the underlying data. This can result in cleaner and more usable correction factors or adjustments to the underlying source model. Furthermore, the multistep process is scalable and can be adjusted based on the data's complexity and the application's requirements, efficiently handling large datasets by distributing the workload. Ultimately, the multistep refinement process optimizes the correction factor, which can include parameters for the source model, for each use case, ensuring the final correction factor meets the application's needs and preserves essential information while managing noise effectively.

Referring now to FIG. 9, is a diagram of a system 900 configured to implement a waypoint prediction engine, according to an embodiment herein. The system 900 may be an example of an apparatus including a computing apparatus 991 that is representative of any system or collection of systems in which the various processes, systems, programs, services, and scenarios disclosed herein may be implemented. For example, computing apparatus 991 may be an example waypoint prediction engine, such as the waypoint prediction engines 110 or 210, a client device, such as the client device 102 or 302, or any of the subcomponents depicted in environments 100 or 200 of FIGS. 1-2, respectively. Examples of computing apparatus 991 include, but are not limited to, server computers, desktop computers, laptop computers, routers, switches, web servers, cloud computing platforms, and data center equipment, as well as any other type of physical or virtual server machine, physical or virtual router, container, and any variation or combination thereof.

Computing apparatus 991 may be implemented as a single apparatus, system, or device or may be implemented in a distributed manner as multiple apparatuses, systems, or devices. Computing apparatus 991 may include, but is not limited to, processing system 996, storage system 993, software 995, communication interface system 997, and user interface system 999. Processing system 996 may be operatively coupled with storage system 993, communication interface system 997, and user interface system 999.

Processing system 996 may load and execute software 995 from storage system 993. Software 995 may include a waypoint prediction engine 992, which may be representative of any of the operations for providing a waypoint prediction engine or any of its related functions, as discussed with respect to the preceding figures. When executed by processing system 996, software 995 may direct processing system 996 to operate as described herein for at least the various processes, such as any of flows 400, 500, 700, or 800, operational scenarios, and sequences discussed in the foregoing implementations. Computing apparatus 991 may optionally include additional devices, features, or functionality not discussed for purposes of brevity.

In some embodiments, processing system 996 may comprise a micro-processor and other circuitry that retrieves and executes software 995 from storage system 993. Processing system 996 may be implemented within a single processing device but may also be distributed across multiple processing devices or sub-systems that cooperate in executing program instructions. Examples of processing system 996 may include general purpose central processing units, graphical processing units, application specific processors, and logic devices, as well as any other type of processing device, combinations, or variations thereof.

Storage system 993 may comprise any memory device or computer-readable storage medium readable by processing system 996 and capable of storing software 995. Storage system 993 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer-readable storage medium a propagated signal.

In addition to computer-readable storage medium, in some implementations storage system 993 may also include computer readable communication media over which at least some of software 995 may be communicated internally or externally. Storage system 993 may be implemented as a single storage device but may also be implemented across multiple storage devices or sub-systems co-located or distributed relative to each other. Storage system 993 may comprise additional elements, such as a controller, capable of communicating with processing system 996 or possibly other systems.

Software 995 (including the waypoint prediction engine 992 among other functions) may be implemented in program instructions that may, when executed by processing system 996, direct processing system 996 to operate as described with respect to the various operational scenarios, sequences, and processes illustrated herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 995 may include additional processes, programs, or components, such as operating system software, virtualization software, or other application software. Software 995 may also comprise firmware or some other form of machine-readable processing instructions executable by processing system 996.

In general, software 995 may, when loaded into processing system 996 and executed, transform a suitable apparatus, system, or device (of which computing apparatus 991 is representative) overall from a general-purpose computing system into a special-purpose computing system as described herein. Indeed, encoding software 995 on storage system 993 may transform the physical structure of storage system 993. The specific transformation of the physical structure may depend on various factors in different implementations of this description. Examples of such factors may include, but are not limited to, the technology used to implement the storage media of storage system 993 and whether the computer-storage media are characterized as primary or secondary storage, as well as other factors.

For example, if the computer-readable storage medium is implemented as semiconductor-based memory, software 995 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 997 may include communication connections and devices that allow for communication with other computing systems (not shown) over communication networks (not shown). Examples of connections and devices that together allow for inter-system communication may include network interface cards, antennas, power amplifiers, radio-frequency (RF) circuitry, transceivers, and other communication circuitry. The connections and devices may communicate over communication media to exchange communications with other computing systems or networks of systems, such as metal, glass, air, or any other suitable communication media.

Communication between the computing apparatus 991 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more memory devices or computer readable medium(s) having computer readable program code embodied thereon.

The foregoing examples and descriptions are described herein in the context of systems and methods for providing a waypoint prediction engine or one or more of its related functions. Those of ordinary skill in the art will realize that these descriptions are illustrative only and are not intended to be in any way limiting. Reference is made in detail to implementations of examples as illustrated in the accompanying drawings. The same reference indicators are used throughout the drawings and the description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. That is, the foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in an embodiment," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a computing apparatus comprising: a computer-readable storage medium; a waypoint prediction engine comprising processor-executable instructions stored on the computer-readable storage medium; and one or more processors coupled to the computer-readable storage medium and configured to execute the processor-executable instructions to operate a, such that the processor-executable instructions, when executed by the one or more processors, direct the computing apparatus, to at least: determine a source model for a client device; determine a current waypoint of the client device as the client device travels along a navigation route; generate a predicted waypoint based on the source model; determine, by a compression-side of the waypoint prediction engine, an accuracy of the predicted waypoint; generate, by the compression-side of the waypoint prediction engine, a correction factor based on the accuracy of the predicted waypoint; and transmit, by the compression-side of the waypoint prediction engine, the correction factor to a decompression-side of the waypoint prediction engine, wherein: the decompression-side of the waypoint prediction engine stores the correction factor; and the correction factor and the source model allow for recreation of the navigation route of the client device.

Example 2 is the computing apparatus of any previous or subsequent Example, wherein: the processor-executable instructions when executed by the one or more processors, further direct the computing apparatus to determine navigation data associated with a client device; and the processor-executable instructions to generate the predicted waypoint based on the source model, when executed by the one or more processors, further direct the computing apparatus to: determine a plurality of historical waypoints based on the navigation data and the source model; and generate the predicted waypoint based on the current waypoint and the historical waypoints.

Example 3 is the computing apparatus of any previous or subsequent Example, wherein the processor-executable instructions when executed by the one or more processors, further direct the computing apparatus to: determine a second current waypoint of the client device along the navigation route; generate a second predicted waypoint based on the source model; determine, by the compression-side of the waypoint prediction engine, an accuracy of the second predicted waypoint; add, by the compression-side of the waypoint prediction engine, the second predicted waypoint to a plurality of historical waypoints based on the accuracy of the second predicted waypoint; and transmit, to the decompression-side of the waypoint prediction engine, an indication that the second predicted waypoint is accurate.

Example 4 is the computing apparatus of any previous or subsequent Example, wherein the processor-executable instructions to generate the predicted waypoint based on the source model, when executed by the one or more processors, further direct the computing apparatus to: determine a plurality of historical waypoints based on the source model; and generate the predicted waypoint by extrapolating between the plurality of historical waypoints.

Example 5 is the computing apparatus of any previous or subsequent Example, wherein the processor-executable instructions to determine, by the compression-side of the waypoint prediction engine, the accuracy of the predicted waypoint, when executed by the one or more processors, further direct the computing apparatus to: determine, by the compression-side of the waypoint prediction engine, a delta between the predicted waypoint and the current waypoint of the client device; and generate, by the compression-side of the waypoint prediction engine, the correction factor based on the delta.

Example 6 is the computing apparatus of any previous or subsequent Example, wherein the processor-executable instructions when executed by the one or more processors, further direct the computing apparatus to: generate a corrected waypoint based on the correction factor and the predicted waypoint; and add the corrected waypoint to a plurality of historical waypoints associated with the source model.

Example 7 is the computing apparatus of any previous or subsequent Example, wherein the processor-executable instructions to determine the source model for the client device, when executed by the one or more processors, further direct the computing apparatus to: receive, from the client device, a selection of a navigation mode; and determine the source model based on the navigation mode.

Example 8 is a method comprising: determining, by a waypoint prediction engine, navigation data associated with a client device; determining, by the waypoint prediction engine, a source model for the client device; determining, by the waypoint prediction engine, a current waypoint of the client device as the client device travels along a navigation route; generating, by a compression-side of the waypoint prediction engine, a predicted waypoint based on the source model and the navigation data; determining, by the compression-side of the waypoint prediction engine, an accuracy of the predicted waypoint; generating, by the compression-side of the waypoint prediction engine, a correction factor based on the accuracy of the predicted waypoint; and transmitting, by the compression-side of the waypoint prediction engine, the correction factor to a decompression-side of the waypoint prediction engine, wherein: the decompression-side of the waypoint prediction engine stores the correction factor; and the correction factor and the source model allow for recreation of the navigation route of the client device.

Example 9 is the method of any previous or subsequent Example, wherein generating, by the waypoint prediction engine, the predicted waypoint based on the source model comprises: determining, by the waypoint prediction engine, a plurality of historical waypoints based on the source model and the navigation data; determining, by the waypoint prediction engine, a speed and direction of the client device based on the plurality of historical waypoints; determining, by the waypoint prediction engine, a predicted path based on the navigation data; and estimating, by the waypoint prediction engine, the predicted waypoint along the predicted path based on the speed and direction of the client device.

Example 10 is the method of any previous or subsequent Example, wherein determining, by the compression-side of the waypoint prediction engine, the accuracy of the predicted waypoint comprises: determining, by the compression-side of the waypoint prediction engine, a delta between the predicted waypoint to the current waypoint of the client device; comparing, by the compression-side of the waypoint prediction engine, the delta a tolerance threshold; determining, by the compression-side of the waypoint prediction engine, that the delta exceeds the tolerance threshold; and generating, by the compression-side of the waypoint prediction engine, the correction factor based on the delta exceeding the tolerance threshold.

Example 11 is the method of any previous or subsequent Example, wherein the method further comprises: determining, by the waypoint prediction engine, a second current waypoint of the client device; generating, by the compression-side of the waypoint prediction engine, a second predicted waypoint based on the source model; determining, by the compression-side of the waypoint prediction engine, that the second predicted waypoint is accurate; and determining, by the compression-side of the waypoint prediction engine, a plurality of predicted waypoints is accurate, wherein the plurality of predicted waypoints comprise the second predicted waypoint; and transmitting, by the compression-side of the waypoint prediction engine, an indication that the plurality of predicated waypoints is accurate to the decompression-side of the waypoint prediction engine.

Example 12 is the method of any previous or subsequent Example, wherein the decompression-side of the waypoint prediction engine: simultaneously generates the predicted waypoint based on the navigation data and source model associated with the client device; generates a corrected waypoint based on the correction factor received from the compression-side of the waypoint prediction engine and the predicted waypoint; and stores the corrected waypoint.

Example 13 is the method of any previous or subsequent Example, wherein the method further comprises: generating, by the compression-side of the waypoint prediction engine, a corrected waypoint based on the correction factor and the predicted waypoint; and adding, by the compression-side of the waypoint prediction engine, the corrected waypoint to a plurality of historical waypoints associated with the source model.

Example 14 is the method of any previous or subsequent Example, wherein determining, by the waypoint prediction engine, navigation data associated with the client device comprises: determining, by the compression-side of the waypoint prediction engine, an initial waypoint of the client device; selecting, by the compression-side of the waypoint prediction engine, the navigation data based on the initial waypoint of the client device; and verifying, by the compression-side of the waypoint prediction engine, that the decompression-side of the waypoint prediction engine selects the same navigation data.

Example 15 is a computer-readable storage medium comprising processor-executable instructions configured to cause one or more processors to: determine, by a waypoint prediction engine, navigation data associated with a client device; determine by the waypoint prediction engine, a source model for the client device; determine, by the waypoint prediction engine, a current waypoint of the client device as the client device travels along a navigation route; generate, by a compression-side of the waypoint prediction engine, a predicted waypoint based on the source model and the navigation data; determine, by the compression-side of the waypoint prediction engine, an accuracy of the predicted waypoint; generate, by the compression-side of the waypoint prediction engine, a correction factor based on the accuracy of the predicted waypoint; and transmit, by the compression-side of the waypoint prediction engine, the correction factor to a decompression-side of the waypoint prediction engine, wherein: the decompression-side of the waypoint prediction engine stores the correction factor; and the correction factor and the source model allow for recreation of the navigation route of the client device.

Example 16 is the computer-readable storage medium of any previous or subsequent Example, wherein the processor-executable instructions to determine, by the compression-side of the waypoint prediction engine, the accuracy of the predicted waypoint cause the one or more processors to further execute processor-executable instructions stored in the computer-readable storage medium to: compare, by the compression-side of the waypoint prediction engine, the predicted waypoint to a tolerance threshold; and generate, by the compression-side of the waypoint prediction engine, the correction factor based on the predicted waypoint exceeding the tolerance threshold.

Example 17 is the computer-readable storage medium of any previous or subsequent Example, wherein the processor-executable instructions cause the one or more processors to further execute processor-executable instructions stored in the computer-readable storage medium to: determine, by the compression-side of the waypoint prediction engine, that a plurality of predicted waypoints is accurate; and transmit, by the compression-side of the waypoint prediction engine, an indication that the plurality of predicted waypoints is accurate to the decompression-side of the waypoint prediction engine.

Example 18 is the computer-readable storage medium of any previous or subsequent Example, wherein the processor-executable instructions to generate, by the waypoint prediction engine, the predicted waypoint based on the source model cause the one or more processors to further execute processor-executable instructions stored in the computer-readable storage medium to: determine, by the waypoint prediction engine, a plurality of historical waypoints based on the source model and the navigation data; determine, by the waypoint prediction engine, a speed of the client device based on the plurality of historical waypoints; determine, by the waypoint prediction engine, a predicted path based on the navigation data; and generate, by the waypoint prediction engine, the predicted waypoint along the predicted path based on the speed of the client device.

Example 19 is the computer-readable storage medium of any previous or subsequent Example, wherein the processor-executable instructions to determine, by the waypoint prediction engine, the source model for the client device cause the one or more processors to further execute processor-executable instructions stored in the computer-readable storage medium to: determine, by the waypoint prediction engine, a navigation mode for the client device; and select, by the waypoint prediction engine, the source model based on the navigation mode.

Example 20 is the computer-readable storage medium of any previous or subsequent Example, wherein the processor-executable instructions to determine, by the waypoint prediction engine, the source model for the client device cause the one or more processors to further execute processor-executable instructions stored in the computer-readable storage medium to: select, by the compression-side of the waypoint prediction engine, the source model based on the client device; and verify, by the compression-side of the waypoint prediction engine, that the decompression-side of the waypoint prediction engine selects the same source model.

Example 21 is a computing apparatus comprising: a computer-readable storage medium; a waypoint prediction engine comprising processor-executable instructions stored on the computer-readable storage medium; and one or more processors coupled to the computer-readable storage medium and configured to execute the processor-executable instructions to operate a, such that the processor-executable instructions, when executed by the one or more processors, direct the computing apparatus, to at least: determine a source model for a client device; generate a predicted waypoint based on the source model for the client device as the client device travels along a navigation route; receive, from a compression-side of the waypoint prediction engine, a correction factor for the predicted waypoint; and store the correction factor as associated with the source model and the client device, wherein the correction factor and the source model allow for recreation of the navigation route of the client device.

Example 22 is the computing apparatus of any previous or subsequent Example, wherein: the processor-executable instructions when executed by the one or more processors, further direct the computing apparatus to determine navigation data associated with a client device; and the processor-executable instructions to generate the predicted waypoint based on the source model, when executed by the one or more processors, further direct the computing apparatus to: determine a plurality of historical waypoints based on the navigation data and the source model; and generate the predicted waypoint based on the historical waypoints.

Example 23 is the computing apparatus of any previous or subsequent Example, wherein the processor-executable instructions when executed by the one or more processors, further direct the computing apparatus to: generate a second predicted waypoint based on the source model; receive, from the compression-side of the waypoint prediction engine, an indication that the second predicted waypoint is accurate; and add the second predicted waypoint to a plurality of historical waypoints based on the second predicted waypoint being accurate.

Example 24 is the computing apparatus of any previous or subsequent Example, wherein the processor-executable instructions to generate the predicted waypoint based on the source model, when executed by the one or more processors, further direct the computing apparatus to: determine a plurality of historical waypoints based on the source model; and generate the predicted waypoint by extrapolating between the plurality of historical waypoints.

Example 25 is the computing apparatus of any previous or subsequent Example, wherein the processor-executable instructions, when executed by the one or more processors, further direct the computing apparatus to: generate a plurality of predicted waypoints based on the source model for the client device as the client device travels along the navigation route; determine a lack of notification from the compression-side of the waypoint prediction engine for the plurality of predicted waypoints; and buffer the plurality of predicted waypoints as unverified accurate.

Example 26 is the computing apparatus of any previous or subsequent Example, wherein the processor-executable instructions when executed by the one or more processors, further direct the computing apparatus to: generate a corrected waypoint based on the correction factor and the predicted waypoint; and add the corrected waypoint to a plurality of historical waypoints associated with the source model.

Example 27 is the computing apparatus of any previous or subsequent Example, wherein the processor-executable instructions to determine the source model for the client device, when executed by the one or more processors, further direct the computing apparatus to: receive, from the client device, a selection of a navigation mode; and determine the source model based on the navigation mode.

Example 28 is a method comprising: determining, by a waypoint prediction engine, navigation data associated with a client device; determining, by the waypoint prediction engine, a source model for the client device; generating, by a decompression-side of the waypoint prediction engine, a predicted waypoint based on the source model and the navigation data for the client device as the client device travels along a navigation route; receiving, from a compression-side of the waypoint prediction engine, a correction factor for the predicted waypoint; and storing, by the decompression-side of the waypoint prediction engine, the correction factor as associated with the source model, wherein the correction factor and the source model allow for recreation of the navigation route of the client device.

Example 29 is the method of any previous or subsequent Example, wherein generating, by the decompression-side of the waypoint prediction engine, the predicted waypoint based on the source model and the navigation route comprises: determining, by the waypoint prediction engine, a plurality of historical waypoints based on the source model and the navigation data; determining, by the waypoint prediction engine, a speed and direction of the client device based on the plurality of historical waypoints; determining, by the waypoint prediction engine, a predicted path based on the navigation data; and estimating, by the waypoint prediction engine, the predicted waypoint along the predicted path based on the speed and direction of the client device.

Example 30 is the method of any previous or subsequent Example, wherein the method further comprises: generating a plurality of predicted waypoints based on the source model for the client device as the client device travels along the navigation route; adding, by the decompression-side of the waypoint prediction engine, the plurality of predicted waypoints to a buffer; receiving, by the decompression-side of the waypoint prediction engine, an indication that the plurality of predicted waypoints is accurate; and removing, by the decompression-side of the waypoint prediction engine, the plurality of predicted waypoints from the buffer.

Example 31 is the method of any previous or subsequent Example, wherein the method further comprises: determining, by the decompression-side of the waypoint prediction engine, a plurality of predicted waypoints, wherein the plurality of predicted waypoints comprise a first subset of predicted waypoints and second subset of predicted waypoints; receiving, by the decompression-side of the waypoint prediction engine, a plurality of correction factors, wherein each of the plurality of correction factors corresponds to a respective predicted waypoint in the first subset of predicted waypoints; and storing, by the decompression-side of the waypoint prediction engine, the plurality of correction factors as associated with the source model, wherein the plurality of correction factors and the source model allow for recreation of the navigation route of the client device.

Example 32 is the method of any previous or subsequent Example, wherein selecting, by the waypoint prediction engine, the navigation data associated with the client device comprises: receiving, from the compression-side of the waypoint prediction engine, a unique identifier; and selecting, by the decompression-side of the waypoint prediction engine, the navigation data based on the unique identifier.

Example 33 is the method of any previous or subsequent Example, wherein the method further comprises: generating, by the decompression-side of the waypoint prediction engine, a corrected waypoint based on the correction factor and the predicted waypoint; and adding, by the decompression-side of the waypoint prediction engine, the corrected waypoint to a plurality of historical waypoints associated with the source model.

Example 34 is the method of any previous or subsequent Example, wherein determining, by the waypoint prediction engine, navigation data associated with the client device comprises: selecting, by the decompression-side of the waypoint prediction engine, the navigation data based on an initial waypoint of the client device; and verifying, by the decompression-side of the waypoint prediction engine, that the compression-side of the waypoint prediction engine selects the same navigation data.

Example 35 is a computer-readable storage medium comprising processor-executable instructions configured to cause one or more processors to: determine, by a waypoint prediction engine, navigation data associated with a client device; determine, by the waypoint prediction engine, a source model for the client device; generate, by a decompression-side of the waypoint prediction engine, a predicted waypoint based on the source model and the navigation data for the client device as the client device travels along a navigation route; receive, from a compression-side of the waypoint prediction engine, a correction factor for the predicted waypoint; and store, by the decompression-side of the waypoint prediction engine, the correction factor as associated with the source model, wherein the correction factor and the source model allow for recreation of the navigation route of the client device.

Example 36 is the computer-readable storage medium of any previous or subsequent Example, wherein the processor-executable instructions cause the one or more processors to further execute processor-executable instructions stored in the computer-readable storage medium to: generate a plurality of predicted waypoints based on the source model for the client device as the client device travels along the navigation route; add by the decompression-side of the waypoint prediction engine, the plurality of predicted waypoints to a buffer; receive, from the compression-side of the waypoint prediction engine, an indication that the plurality of predicted waypoints is accurate; and remove, by the decompression-side of the waypoint prediction engine, the plurality of predicted waypoints from the buffer.

Example 37 is the computer-readable storage medium of any previous or subsequent Example, wherein the processor-executable instructions cause the one or more processors to further execute processor-executable instructions stored in the computer-readable storage medium to: determine, by the decompression-side of the waypoint prediction engine, a plurality of predicted waypoints, wherein the plurality of predicted waypoints comprise a first subset of predicted waypoints and second subset of predicted waypoints; receive, from the compression-side of the waypoint prediction engine, a plurality of correction factors, wherein each of the plurality of correction factors corresponds to a respective predicted waypoint in the first subset of predicted waypoints; receive, from the compression-side of the waypoint prediction engine, an indication that the second subset of predicted waypoints is accurate; and store, by the decompression-side of the waypoint prediction engine, the plurality of correction factors as associated with the source model, wherein the plurality of correction factors and the source model allow for recreation of the navigation route of the client device.

Example 38 is the computer-readable storage medium of any previous or subsequent Example, wherein the processor-executable instructions to generate, by decompression-side of the waypoint prediction engine, the predicted waypoint based on the source model cause the one or more processors to further execute processor-executable instructions stored in the computer-readable storage medium to: determine, by the decompression-side of the waypoint prediction engine, a plurality of historical waypoints based on the source model and the navigation data; determine, by the decompression-side of the waypoint prediction engine, a speed of the client device based on the plurality of historical waypoints; determine, by the decompression-side of the waypoint prediction engine, a predicted path based on the navigation data; and generate, by the decompression-side of the waypoint prediction engine, the predicted waypoint along the predicted path based on the speed of the client device.

Example 39 is the computer-readable storage medium of any previous or subsequent Example, wherein the processor-executable instructions to determine, by the waypoint prediction engine, the source model for the client device cause the one or more processors to further execute processor-executable instructions stored in the computer-readable storage medium to: determine, by the waypoint prediction engine, a navigation mode for the client device; and select, by the waypoint prediction engine, the source model based on the navigation mode.

Example 40 is the computer-readable storage medium of any previous or subsequent Example, wherein the processor-executable instructions to determine, by the waypoint prediction engine, the source model for the client device cause the one or more processors to further execute processor-executable instructions stored in the computer-readable storage medium to: select, by the decompression-side of the waypoint prediction engine, the source model based on the client device; and verify, by the decompression-side of the waypoint prediction engine, that the compression-side of the waypoint prediction engine selects the same source model.

What is claimed is:

1. A computing apparatus comprising:
  a computer-readable storage medium;
  a waypoint prediction engine comprising processor-executable instructions stored on the computer-readable storage medium; and
  one or more processors coupled to the computer-readable storage medium and configured to execute the processor-executable instructions to operate the waypoint prediction engine, such that the processor-executable instructions, when executed by the one or more processors, direct the computing apparatus to at least:
    determine a source model for a client device;
    determine a current waypoint of the client device as the client device travels along a navigation route;
    generate a predicted waypoint based on the source model;
    determine, by a compression-side of the waypoint prediction engine, a tolerance threshold;
    determine, by the compression-side of the waypoint prediction engine, an accuracy of the predicted waypoint based on the tolerance threshold;
    generate, by the compression-side of the waypoint prediction engine, a correction factor based on the accuracy of the predicted waypoint; and transmit, by the compression-side of the waypoint prediction engine, the correction factor to a decompression-side of the waypoint prediction engine, wherein:
the decompression-side of the waypoint prediction engine stores the correction factor; and
the correction factor and the source model allow for recreation of the navigation route of the client device.

2. The computing apparatus of claim 1, wherein:
the processor-executable instructions when executed by the one or more processors, further direct the computing apparatus to determine navigation data associated with a client device; and
the processor-executable instructions to generate the predicted waypoint based on the source model, when executed by the one or more processors, further direct the computing apparatus to:
determine a plurality of historical waypoints based on the navigation data and the source model; and
generate the predicted waypoint based on the current waypoint and the historical waypoints.

3. The computing apparatus of claim 1, wherein the processor-executable instructions when executed by the one or more processors, further direct the computing apparatus to:
determine a second current waypoint of the client device along the navigation route;
generate a second predicted waypoint based on the source model;
determine, by the compression-side of the waypoint prediction engine, an accuracy of the second predicted waypoint;
add, by the compression-side of the waypoint prediction engine, the second predicted waypoint to a plurality of historical waypoints based on the accuracy of the second predicted waypoint; and
transmit, to the decompression-side of the waypoint prediction engine, an indication that the second predicted waypoint is accurate.

4. The computing apparatus of claim 1, wherein the processor-executable instructions to generate the predicted waypoint based on the source model, when executed by the one or more processors, further direct the computing apparatus to:
determine a plurality of historical waypoints based on the source model; and
generate the predicted waypoint by extrapolating between the plurality of historical waypoints.

5. The computing apparatus of claim 1, wherein the processor-executable instructions to determine, by the compression-side of the waypoint prediction engine, the accuracy of the predicted waypoint, when executed by the one or more processors, further direct the computing apparatus to:
determine, by the compression-side of the waypoint prediction engine, a delta between the predicted waypoint and the current waypoint of the client device; and
generate, by the compression-side of the waypoint prediction engine, the correction factor based on the delta.

6. The computing apparatus of claim 1, wherein the processor-executable instructions when executed by the one or more processors, further direct the computing apparatus to:
generate a corrected waypoint based on the correction factor and the predicted waypoint; and
add the corrected waypoint to a plurality of historical waypoints associated with the source model.

7. The computing apparatus of claim 1, wherein the processor-executable instructions to determine the source model for the client device, when executed by the one or more processors, further direct the computing apparatus to:
receive, from the client device, a selection of a navigation mode; and
determine the source model based on the navigation mode.

8. A method comprising:
determining, by a waypoint prediction engine, navigation data associated with a client device;
determining, by the waypoint prediction engine, a source model for the client device;
determining, by the waypoint prediction engine, a current waypoint of the client device as the client device travels along a navigation route;
generating, by a compression-side of the waypoint prediction engine, a predicted waypoint based on the source model and the navigation data;
determining, by the compression-side of the waypoint prediction engine, a tolerance threshold for the predicted waypoint;
determining, by the compression-side of the waypoint prediction engine, an accuracy of the predicted waypoint based on the tolerance threshold;
generating, by the compression-side of the waypoint prediction engine, a correction factor based on the accuracy of the predicted waypoint; and
transmitting, by the compression-side of the waypoint prediction engine, the correction factor to a decompression-side of the waypoint prediction engine, wherein:
the decompression-side of the waypoint prediction engine stores the correction factor; and
the correction factor and the source model allow for recreation of the navigation route of the client device.

9. The method of claim 8, wherein generating, by the waypoint prediction engine, the predicted waypoint based on the source model comprises:
determining, by the waypoint prediction engine, a plurality of historical waypoints based on the source model and the navigation data;
determining, by the waypoint prediction engine, a speed and direction of the client device based on the plurality of historical waypoints;
determining, by the waypoint prediction engine, a predicted path based on the navigation data; and
estimating, by the waypoint prediction engine, the predicted waypoint along the predicted path based on the speed and direction of the client device.

10. The method of claim 8, wherein determining, by the compression-side of the waypoint prediction engine, the accuracy of the predicted waypoint comprises:
determining, by the compression-side of the waypoint prediction engine, a delta between the predicted waypoint and the current waypoint of the client device;
comparing, by the compression-side of the waypoint prediction engine, the delta the tolerance threshold;
determining, by the compression-side of the waypoint prediction engine, that the delta exceeds the tolerance threshold; and
generating, by the compression-side of the waypoint prediction engine, the correction factor based on the delta exceeding the tolerance threshold.

11. The method of claim 8, wherein the method further comprises:

determining, by the waypoint prediction engine, a second current waypoint of the client device;

generating, by the compression-side of the waypoint prediction engine, a second predicted waypoint based on the source model;

determining, by the compression-side of the waypoint prediction engine, that the second predicted waypoint is accurate; and determining, by the compression-side of the waypoint prediction engine, a plurality of predicted waypoints is accurate, wherein the plurality of predicted waypoints comprise the second predicted waypoint; and transmitting, by the compression-side of the waypoint prediction engine, an indication that the plurality of predicted waypoints is accurate to the decompression-side of the waypoint prediction engine.

12. The method of claim 8, wherein the decompression-side of the waypoint prediction engine:
   simultaneously generates the predicted waypoint based on the navigation data and source model associated with the client device;
   generates a corrected waypoint based on the correction factor received from the compression-side of the waypoint prediction engine and the predicted waypoint; and
   stores the corrected waypoint.

13. The method of claim 8, wherein the method further comprises:
   generating, by the compression-side of the waypoint prediction engine, a corrected waypoint based on the correction factor and the predicted waypoint; and
   adding, by the compression-side of the waypoint prediction engine, the corrected waypoint to a plurality of historical waypoints associated with the source model.

14. The method of claim 8, wherein determining, by the waypoint prediction engine, navigation data associated with the client device comprises:
   determining, by the compression-side of the waypoint prediction engine, an initial waypoint of the client device;
   selecting, by the compression-side of the waypoint prediction engine, the navigation data based on the initial waypoint of the client device; and
   verifying, by the compression-side of the waypoint prediction engine, that the decompression-side of the waypoint prediction engine selects the same navigation data.

15. A computer-readable storage medium comprising processor-executable instructions configured to cause one or more processors to:
   determine, by a waypoint prediction engine, navigation data associated with a client device;
   determine, by the waypoint prediction engine, a source model for the client device;
   determine, by the waypoint prediction engine, a current waypoint of the client device as the client device travels along a navigation route;
   generate, by a compression-side of the waypoint prediction engine, a predicted waypoint based on the source model and the navigation data;
   determine, by the compression-side of the waypoint prediction engine, a tolerance threshold for the predicted waypoint;
   determine, by the compression-side of the waypoint prediction engine, an accuracy of the predicted waypoint based on the tolerance threshold;
   generate, by the compression-side of the waypoint prediction engine, a correction factor based on the accuracy of the predicted waypoint; and
   transmit, by the compression-side of the waypoint prediction engine, the correction factor to a decompression-side of the waypoint prediction engine, wherein:
      the decompression-side of the waypoint prediction engine stores the correction factor; and
      the correction factor and the source model allow for recreation of the navigation route of the client device.

16. The computer-readable storage medium of claim 15, wherein the processor-executable instructions to determine, by the compression-side of the waypoint prediction engine, the accuracy of the predicted waypoint cause the one or more processors to further execute processor-executable instructions stored in the computer-readable storage medium to:
   determine, by the compression-side of the waypoint prediction engine, a delta between the predicted waypoint and the current waypoint of the client device;
   compare, by the compression-side of the waypoint prediction engine, the delta to the tolerance threshold; and
   generate, by the compression-side of the waypoint prediction engine, the correction factor based on the delta exceeding the tolerance threshold.

17. The computer-readable storage medium of claim 15, wherein the processor-executable instructions cause the one or more processors to further execute processor-executable instructions stored in the computer-readable storage medium to:
   determine, by the compression-side of the waypoint prediction engine, that a plurality of predicted waypoints is accurate; and
   transmit, by the compression-side of the waypoint prediction engine, an indication that the plurality of predicted waypoints is accurate to the decompression-side of the waypoint prediction engine.

18. The computer-readable storage medium of claim 15, wherein the processor-executable instructions to generate, by the waypoint prediction engine, the predicted waypoint based on the source model cause the one or more processors to further execute processor-executable instructions stored in the computer-readable storage medium to:
   determine, by the waypoint prediction engine, a plurality of historical waypoints based on the source model and the navigation data;
   determine, by the waypoint prediction engine, a speed of the client device based on the plurality of historical waypoints;
   determine, by the waypoint prediction engine, a predicted path based on the navigation data; and
   generate, by the waypoint prediction engine, the predicted waypoint along the predicted path based on the speed of the client device.

19. The computer-readable storage medium of claim 15, wherein the processor-executable instructions to determine, by the waypoint prediction engine, the source model for the client device cause the one or more processors to further execute processor-executable instructions stored in the computer-readable storage medium to:
   determine, by the waypoint prediction engine, a navigation mode for the client device; and
   select, by the waypoint prediction engine, the source model based on the navigation mode.

20. The computer-readable storage medium of claim 15, wherein the processor-executable instructions to determine, by the waypoint prediction engine, the source model for the client device cause the one or more processors to further execute processor-executable instructions stored in the computer-readable storage medium to:
- select, by the compression-side of the waypoint prediction engine, the source model based on the client device; and
- verify, by the compression-side of the waypoint prediction engine, that the decompression-side of the waypoint prediction engine selects the same source model.

* * * * *